United States Patent
Suzuki et al.

(10) Patent No.: US 7,731,394 B2
(45) Date of Patent: Jun. 8, 2010

(54) DISPLAY DEVICE

(75) Inventors: Tsuneo Suzuki, Aichi (JP); Yasuya Mita, Aichi (JP); Noriyuki Besshi, Aichi (JP); Wataru Yokoyama, Aichi (JP); Minoru Toeda, Aichi (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 239 days.

(21) Appl. No.: 11/977,802

(22) Filed: Oct. 25, 2007

(65) Prior Publication Data

US 2008/0106187 A1    May 8, 2008

(30) Foreign Application Priority Data

Dec. 13, 2006    (JP) .............................. 2006-335500

(51) Int. Cl.
*F21V 5/00*    (2006.01)
(52) U.S. Cl. .................. 362/330; 362/297; 362/623
(58) Field of Classification Search ................. 362/330, 362/97.1–97.4, 600–634, 297, 296.01, 559, 362/560, 812
See application file for complete search history.

(56) References Cited

U.S. PATENT DOCUMENTS 4,240,220 A    12/1980    Smith

2002/0043012 A1    4/2002    Shibata et al.

FOREIGN PATENT DOCUMENTS

| JP | 03-287427 A | 12/1991 |
| JP | 5-238325 | 9/1993 |
| JP | 05-238325 | * 9/1993 |
| JP | 7-19770 | 9/1993 |
| JP | 2006-039285 | 2/2006 |

OTHER PUBLICATIONS

European Search Report for Application No. 07119096.1-2421, dated Nov. 18, 2009.

* cited by examiner

*Primary Examiner*—Bao Q Truong
(74) *Attorney, Agent, or Firm*—Locke Lord Bissell & Liddell LLP

(57) ABSTRACT

The present invention provides a display device including: a transparent plate having at least one recessed portion formed on a rear surface side thereof, the recessed portion forming a pattern corresponding to a design to be displayed; a first reflecting member which is disposed on the rear surface side of the transparent plate and on a region except for the recessed portion of the transparent plate, and has light reflectivity at a surface facing the transparent plate; a second reflecting member which is disposed on the rear surface side of the transparent plate and on a region including the recessed portion of the transparent plate, and has light reflectivity at a surface facing the transparent plate; and a light emitting device for emitting light, when illuminated, to a front surface side of the transparent plate through the recessed portion of the transparent plate without exiting light from the region except for the recessed portion of the transparent plate to the front surface side of the transparent plate, the light source being disposed on the rear surface side of the transparent plate.

26 Claims, 14 Drawing Sheets

DISPLAY DEVICE

BACKGROUND OF THE INVENTION

1. Field of the Invention

The present invention relates to a display device, and more particularly, to a display device which luminously displays a subject to be displayed such as a character or a pictorial figure, and is enhanced in appearance when not illuminated.

2. Description of the Related Art

JP 05-238325 A discloses a luminous ornament which is equipped with a transparent front cover, a light guide provided with a half mirror, and an LED, in which the transparent front cover has recessed portions formed in a back surface thereof, a light shielding layer is formed on the back surface of the transparent front cover except for regions where the recessed portions are formed, the light guide is disposed on the back surface side of the front cover, and the LED is disposed as a light source on the back surface side of the light guide. Light emitted from the LED is diffused by the light guide, passes through the half mirror, and exits outside through the recessed portions of the front cover. When the LED is not emitting light, outside light passes through the recessed portions of the front cover to be reflected by the half mirror, and exits outside again through the recessed portions. Accordingly, the luminous ornament is capable of luminously displaying the recessed portions of the front cover, as well as reflecting outside light which has entered into the recessed portions of the front cover.

In the luminous ornament according to JP 05-238325 A, however, the recessed portions of the front cover and the regions except for the recessed portions look significantly different from each other when the luminous ornament is not illuminated, because outside light which has entered the luminous ornament is shielded by the light shielding layer at the regions except for the recessed portions of the front cover, while the outside light that has entered the recessed portions of the front cover is reflected by the half mirror. Therefore, it adversely emphasizes the difference in materials between the recessed portions and the regions except for the recessed portions on the front cover, leading to a problem that the luminous ornament is degraded in its appearance.

SUMMARY OF THE INVENTION

The present invention has been made to solve the above-mentioned problem inherent in the prior art, and therefore, it is an object of the present invention to provide a display device which luminously displays a design as a subject to be displayed when illuminated, while being enhanced in appearance when not illuminated.

Also, the present invention has another object to provide a display device which is illuminated at intensity (for example, intensity of 10 cd or less) lower than that of outside light even when illuminated, to thereby make the display device appear as if the display device is not illuminated in a bright environment even when the light source is emitting light.

A display device according to the present invention includes: a transparent plate having at least one recessed portion formed on a rear surface side thereof, the recessed portion forming a pattern corresponding to a design to be displayed; a first reflecting member which is disposed on the rear surface side of the transparent plate and on a region outside the recessed portion of the transparent plate, and has light reflectivity at a surface facing the transparent plate; a second reflecting member which is disposed on the rear surface side of the transparent plate and on a region including the recessed portion of the transparent plate, and has light reflectivity at a surface facing the transparent plate; and a light source for emitting light, when illuminated, to a front surface side of the transparent plate through the recessed portion of the transparent plate without exiting light from the region outside the recessed portion of the transparent plate to the front surface side of the transparent plate, the light source being disposed on the rear surface side of the transparent plate.

DETAILED DESCRIPTION OF THE PREFERRED EMBODIMENTS

Hereinbelow, embodiments of the present invention is described with reference to the accompanying drawings.

Embodiment 1

Figure 1:
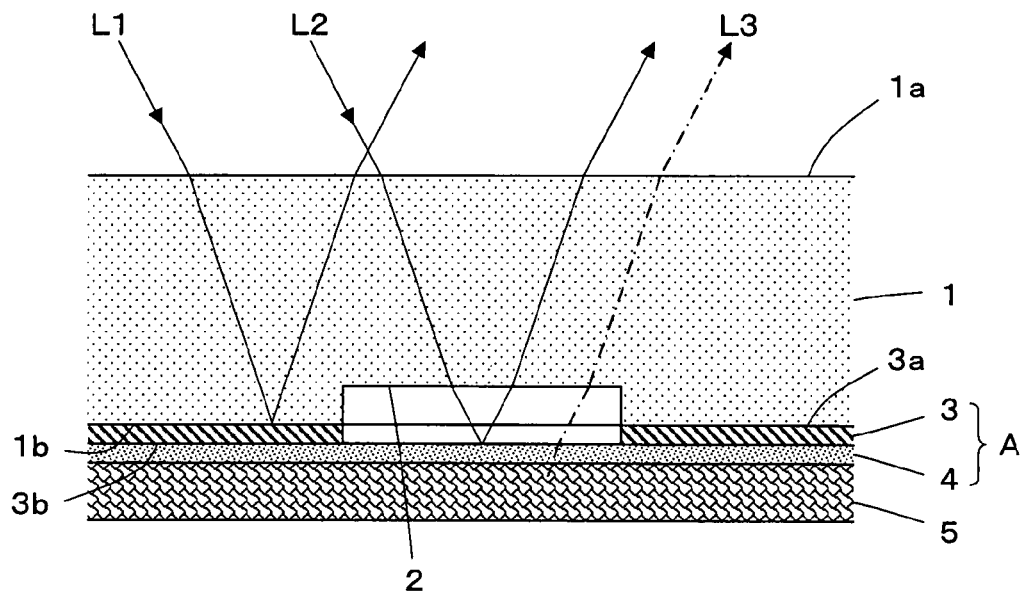
FIGS. 1 and 2 are sectional views each illustrating a structure of a display device according to each of Embodiments 1 and 2 of the present invention, respectively.

FIG. 1 is a sectional view of a display device according to Embodiment 1 of the present invention. The display device includes a transparent plate 1, which has a recessed portion 2 formed on a rear surface 1b side thereof. The recessed portion 2 is formed according to a pattern corresponding to a design to be displayed by the display device. A light shielding layer 3 is provided on the rear surface 1b of the transparent plate 1, except for a region corresponding to the recessed portion 2. The light shielding layer 3 has light reflectivity at a front surface 3a thereof which is facing the rear surface 1b of the transparent plate 1. On a rear surface 3b side of the light shielding layer 3, a half mirror layer 4 is provided across an entire surface of the transparent plate 1. Further, a light source 5 is provided on a rear surface side of the half mirror layer 4. The light shielding layer 3 and the half mirror layer 4 form a design formation layer A.

The transparent plate 1 may be formed of a transparent resin plate made of, for example, polycarbonate or acrylic, or may be formed of a glass plate. A material for forming the transparent plate 1 is not limited as long as the material is transparent and the recessed portion 2 can be formed therein.

The light shielding layer 3 having light reflectivity may be formed by evaporating a metallic material, such as Al, Cr, or Mo onto the rear surface 1b of the transparent plate 1, except for the region corresponding to the recessed portion 2. Alternatively, the light shielding layer 3 may also be formed of a sheet made of the metallic material described above, which is attached to the rear surface 1b of the transparent plate 1 except for the region corresponding to the recessed portion 2.

The half mirror layer 4 may be formed of a half mirror sheet made of a metallic material, such as Al, Cr, or Mo. Alternatively, the half mirror layer 4 may also be formed by evaporating or sputter-depositing a metallic material, such as Al, Cr, or Mo onto a front surface of the light source 5.

The half mirror layer 4 and the light shielding layer 3 which form the design formation layer A may be sequentially laminated onto, for example, a transparent sheet material, so as to be integrally formed into a film sheet-like shape or a thin plate-like shape, and this lamination may be inserted between the transparent plate 1 and the light source 5. It is sufficient that the half mirror layer 4 is provided at least to a region corresponding to the recessed portion 2 in the transparent plate 1. Accordingly, when providing the half mirror layer 4 and the light shielding layer 3 onto the transparent sheet material or onto the front surface of the light source 5, the half mirror layer 4 may be formed on the region corresponding to the recessed portion 2 in the transparent plate 1 and the light shielding layer 3 may be formed on a region except for the recessed portion 2 in the transparent plate 1, in patterns respectively corresponding to those regions.

Any type of device can be employed as the light source 5, as long as the device is capable of emitting light at least to the region corresponding to the recessed portion 2 in the transparent plate 1. Examples of the device include a device which has LEDs or fluorescent tubes set in array and a device for guiding light from an LED or a fluorescent tube by a light guide. Further, an area emitting device such as an electroluminescence device may also be employed as the light source 5.

Next, an operation of the display device according to Embodiment 1 is described. The display device displays a design formed by the recessed portion 2 in the transparent plate 1. The display device is disposed in an interior of a vehicle or the like, in a manner that the front surface 1a of the transparent plate 1 is directed toward the interior, for example.

When the light source 5 is not emitting light, the design formed by the recessed portion 2 can be identified through the transparent plate 1 by means of outside light. At this time, because the light shielding layer 3 having light reflectivity is provided on the rear surface 1b of the transparent plate 1 except for the region corresponding to the recessed portion 2, outside light L1 which has reached the light shielding layer 3 after passing through the transparent plate 1 is reflected by the front surface 3a of the light shielding layer 3 to pass through the transparent plate 1 again, and exits outside. Also, because the half mirror layer 4 is provided so as to be facing the recessed portion 2 in the transparent plate 1, outside light L2 which has reached the recessed portion 2 after passing through the transparent plate 1 enters the half mirror layer 4 through the recessed portion 2, is reflected by a surface of the half mirror layer 4, and exits outside by passing through the transparent plate 1 again.

As described above, outside light is similarly reflected on the rear surface 1b side of the transparent plate 1, regardless of whether the outside light has entered the region except for the recessed portion 2 or the region corresponding to the recessed portion 2. Accordingly, it appears as if a portion corresponding to the design formed by the recessed portion 2 and a portion except for the design are made of the same material. Further, due to the recessed portion 2, the portion corresponding to the design looks like being embossed with respect to the remaining portion, which gives an impression that as if the design is formed by stamping a metallic plate.

When the light shielding layer 3 and the half mirror layer 4 have reflecting powers closer to each other, the portion corresponding to the design formed by the recessed portion 2 and the portion outside the design look more similar to each other. Accordingly, when the light shielding layer 3 and the half mirror layer 4 have reflecting powers substantially equal to each other, the above-mentioned effect of making the design appear as if being formed by stamping a metallic plate becomes maximum.

Further, when the light shielding layer 3 and the half mirror layer 4 have reflectance spectra closer to each other, the portion corresponding to the design formed by the recessed portion 2 and the remaining portion are made more similar to each other in tone of color. Accordingly, in order to make the design appear as if the design is formed by stamping a metallic plate as described above, the light shielding layer 3 and the half mirror layer 4 preferably have reflectance spectra substantially equal to each other.

Meanwhile, when the light source 5 starts emitting light, light L3 emitted from the light source 5, which is indicated by the dashed-dotted line of FIG. 1, passes through the half mirror layer 4, enters the transparent plate 1 through the recessed portion 2 in which the light shielding layer 3 does not exist, and exits outside after passing through the transparent plate 1. At this time, in the region except for the recessed portion 2, light emitted from the light source 5 is shielded by the light shielding layer 3, and therefore only the portion corresponding to the design formed by the recessed portion 2 looks illuminated.

In other words, when the light source 5 is not emitting light, it looks as if the design is formed by stamping a metallic plate, which leads to an impression that light does not transmit through the design. However, when the light source 5 starts emitting light, only the portion corresponding to the design is illuminated, to thereby attain a display device enhanced in appearance.

Embodiment 2

Figure 2:
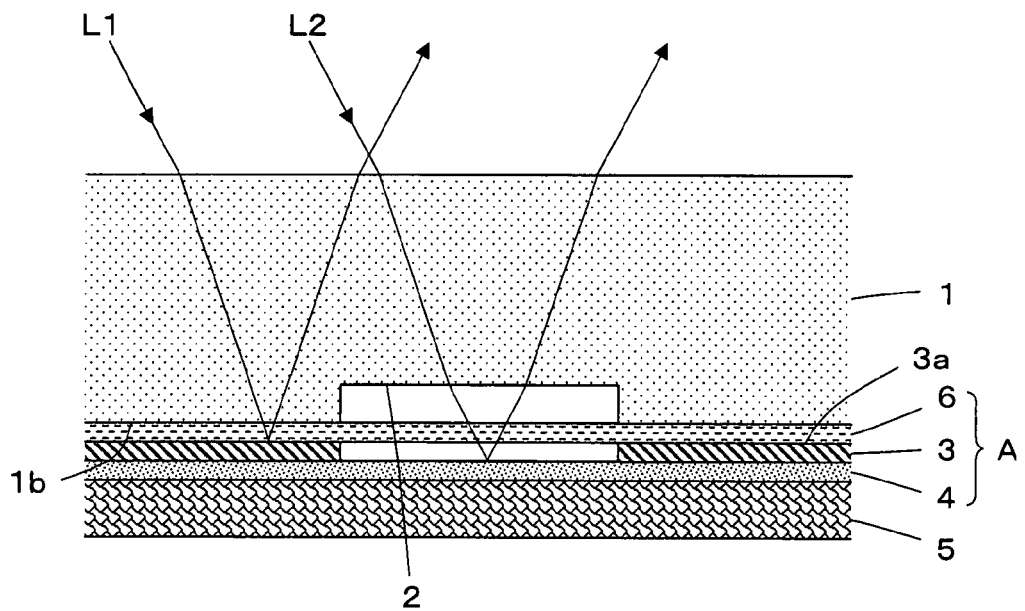

As shown in FIG. 2, a pattern layer 6 may additionally be provided to the display device of Embodiment 1 described above. The pattern layer 6 may be provided between the transparent plate 1 and the light shielding layer 3 so as to cover across an entire surface on the rear surface 1b of the transparent plate 1, that is, across both of the region corresponding to the recessed portion 2 and the region except for the recessed portion 2. The pattern layer 6 has a hairline pattern or the like provided over an entire surface thereof, and substantially has optical transparency. According to Embodiment 2, the light shielding layer 3, the half mirror layer 4, and the pattern layer 6 form the design formation layer A.

With the above-mentioned structure, when the light source 5 is not emitting light, the outside light L1 and the outside light L2, which pass through the transparent plate 1 to reach the light shielding layer 3 and the recessed portion 2, respectively, pass through the pattern layer 6 to be reflected by the front surface 3a of the light shielding layer 3 and by the half mirror layer 4, respectively, and exit outside after passing through the pattern layer 6 and the transparent plate 1 again. Accordingly, the pattern on the pattern layer 6 looks superimposed on the design formed by the recessed portion 2 and on the portion except for the design, which further enhances the effect of making those portions appear as if being formed of the same material.

For example, when the pattern layer 6 on which a hairline pattern is provided is used, it is possible to make the design appear as if the design is formed by stamping a hairline-processed aluminum plate, to thereby provide more luxurious quality to the display device. A pattern to be provided on the pattern layer 6 is not limited to a hairline pattern, and various patterns having various shapes and sizes may also be provide on the pattern layer 6. In particular, in a case where the display device is provided to a wall, a floor, or a ceiling, the pattern layer 6 having a pattern similar to a pattern of an area surrounding the display device may be employed to make the display device further blended into the surrounding area.

Figure 3:
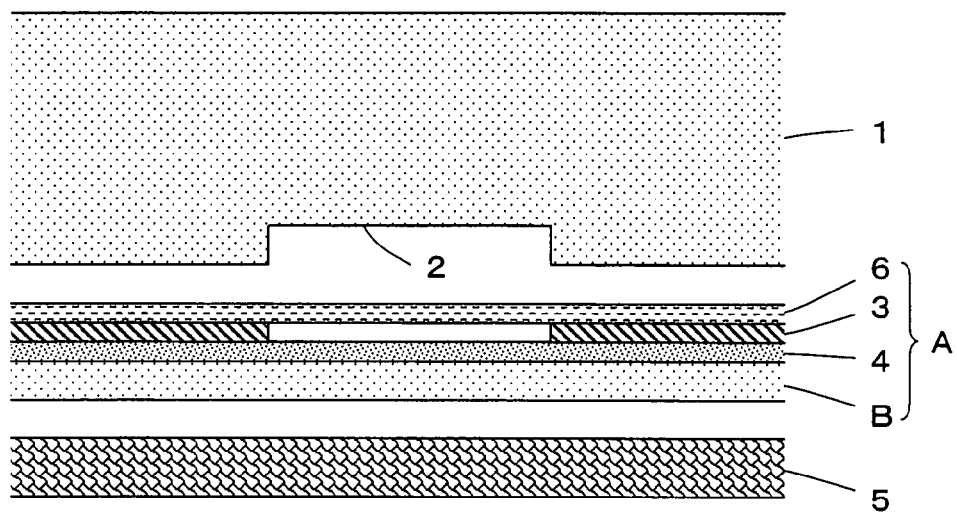
FIG. 3 is a sectional view illustrating a structure of a display device according to a modification example of Embodiment 2.

Also, as shown in FIG. 3, the half mirror layer 4, the light shielding layer 3, and the pattern layer 6 may be sequentially laminated onto a transparent sheet material B, so as to be integrally formed into a film sheet-like shape or a thin plate-like shape, and this lamination may be inserted, as the design formation layer A, between the transparent plate 1 and the light source 5.

Embodiment 3

Figure 4:
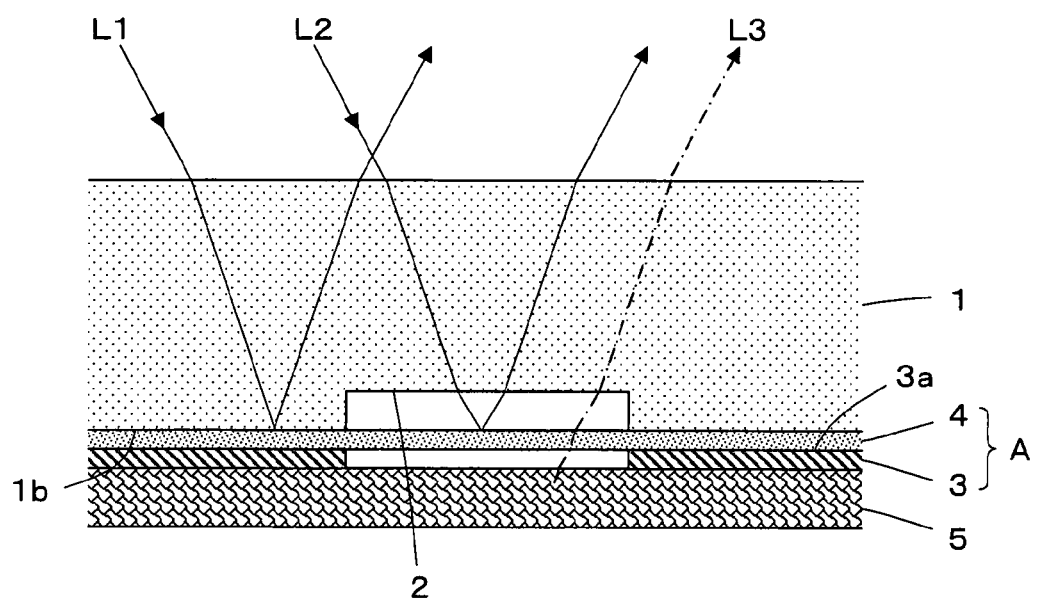
FIGS. 4 and 5 are sectional views each illustrating a structure of a display device according to each of Embodiments 3 and 4 of the present invention, respectively.

FIG. 4 is a sectional view of a display device according to Embodiment 3. In the display device, instead of providing the half mirror layer 4 on the rear surface 3b side of the light shielding layer 3 as in the display device according to Embodiment 1 shown in FIG. 1, the half mirror layer 4 is provided between the rear surface 1b of the transparent layer 1 and the front surface 3a of the light shielding layer 3, and the light shielding layer 3 and the half mirror layer 4 form the design formation layer A. Similarly to Embodiment 1, the half mirror layer 4 is provided across an entire surface of the transparent plate 1, and the light shielding layer 3 is provided to the transparent plate 1 except for the region corresponding to the recessed portion 2.

When the light source 5 is not emitting light, the design formed by the recessed portion 2 can be identified through the transparent plate 1 by means of outside light. The outside light L1, which passes through the transparent plate 1 in the region except for the recessed portion 2 to reach the half mirror layer 4, and the outside light L2, which passes through the transparent plate 1 in the region corresponding to the recessed portion 2 to reach the half mirror layer 4, are both reflected on a surface of the half mirror layer 4 to pass through the transparent plate 1 again, and then exit outside. In this manner, the outside light L1 and the outside light L2 are both reflected by the common half mirror layer 4 both in the region except for the recessed portion 2 and in the region corresponding to the recessed portion 2. That is, the outside light L1 and the outside light L2 are reflected at the same reflecting power, which makes a portion corresponding to the design formed by the recessed portion 2 and a portion except for the design appear as if being made of the same material, and the portion corresponding to the design looks embossed with respect to the remaining portion due to the recessed portion 2, giving an impression that as if the design is formed by stamping a metallic plate.

When the light source 5 starts emitting light, light L3 emitted from the light source 5, which is indicated by the dashed-dotted line of FIG. 4, passes through the half mirror layer 4, enters the transparent plate 1 through the recessed portion 2, and exits outside after passing through the transparent plate 1. At this time, in the region except for the recessed portion 2, light emitted from the light source 5 is shielded by the light shielding layer 3, and therefore only the portion corresponding to the design formed by the recessed portion 2 looks illuminated.

According to Embodiment 3, when the light source 5 is not emitting light, the outside light L1 and the outside light L2 are reflected on the half mirror layer 4 which is disposed on the front surface 3a side of the light shielding layer 3, and therefore the light shielding layer 3 does not need to have light reflectivity unlike in Embodiment 1. Accordingly, the light shielding layer 3 can be formed of a material selected from various materials capable of shielding light.

Also, the half mirror layer 4 and the light shielding layer 3 which form the design formation layer A may be sequentially laminated onto, for example, a transparent sheet material, so as to be integrally formed into a film sheet-like shape or a thin plate-like shape, and this lamination may be inserted between the transparent plate 1 and the light source 5 in a manner that the half mirror layer 4 faces the transparent plate 1.

Embodiment 4

Figure 5:
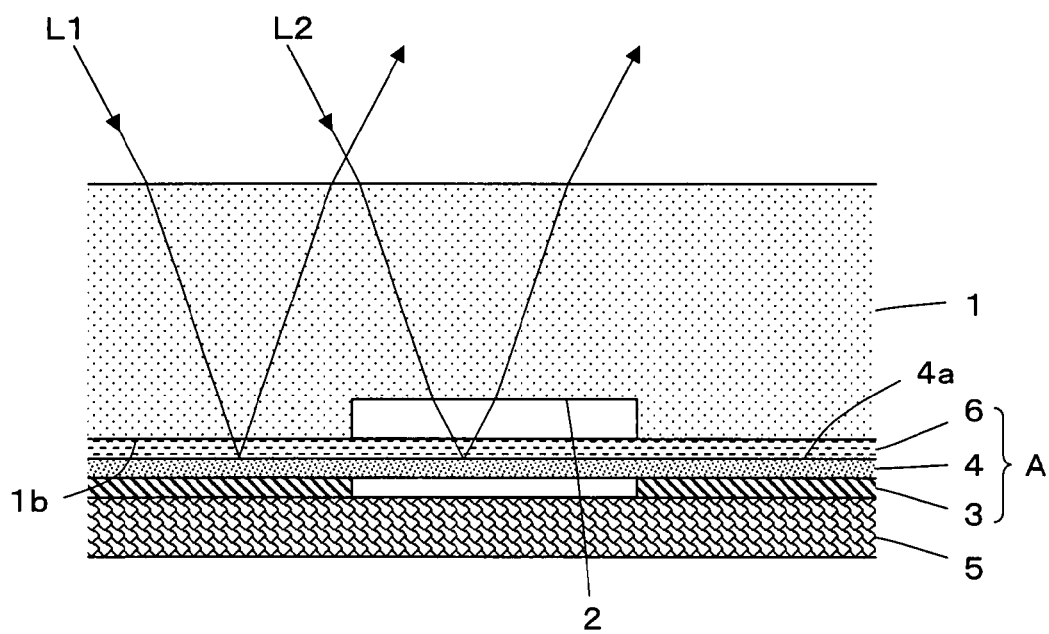

As shown in FIG. 5, an optically-transparent pattern layer 6 having a hairline pattern or the like provided over an entire surface thereof may additionally be provided to the display device of Embodiment 3 described above. The pattern layer 6 may be provided between the transparent plate 1 and the half mirror layer 4 so as to cover across an entire surface on the rear surface 1b side of the transparent plate 1, that is, across both of the region corresponding to the recessed portion 2 and the region except for the recessed portion 2. In Embodiment 4, the light shielding layer 3, the half mirror layer 4, and the pattern layer 6 form the design formation layer A.

With the above-mentioned structure, when the light source 5 is not emitting light, the outside light L1, which passes through the transparent plate 1 in the region except for the recessed portion 2 to reach the half mirror layer 4, and the outside light L2, which passes through the transparent plate 1 in the region corresponding to the recessed portion 2 to reach the half mirror layer 4, both pass through the pattern layer 6 to be reflected by the half mirror layer 4, and pass through the pattern layer 6 and the transparent plate 1 again to exit outside. Accordingly, as in Embodiment 2, the pattern on the pattern layer 6 looks superimposed on the design formed by the recessed portion 2 and on the portion except for the design, which further enhances the effect of making those portions appear as if being formed of the same material.

Figure 6:
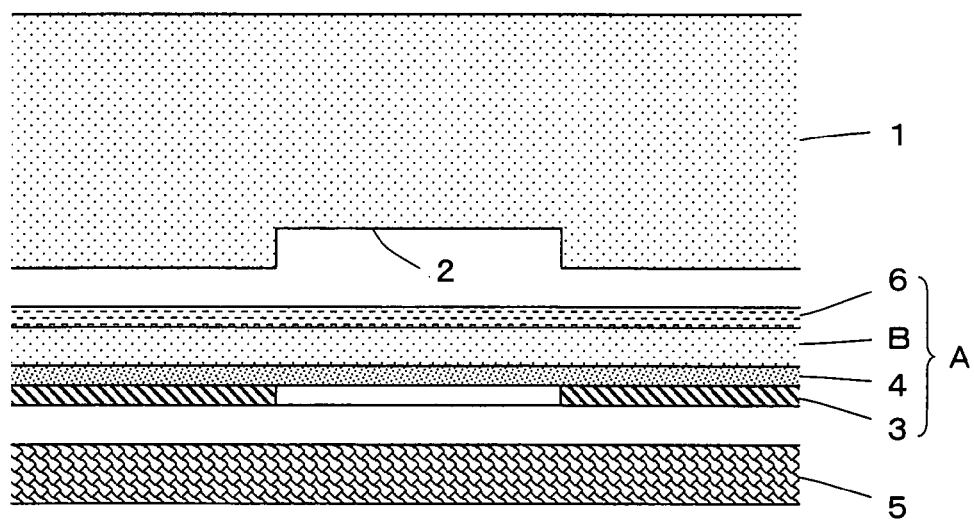
FIG. 6 is a sectional view illustrating a structure of a display device according to a modification example of Embodiment 4.

Also, as shown in FIG. 6, the pattern layer 6 may be formed on a transparent sheet material B and the half mirror layer 4 and the light shielding layer 3 may be sequentially laminated onto a lower surface of the transparent sheet B, so as to be integrally formed into a film sheet-like shape or a thin plate-like shape, and this lamination may be inserted, as the design formation layer A, between the transparent plate 1 and the light source 5.

Embodiment 5

Figure 7:
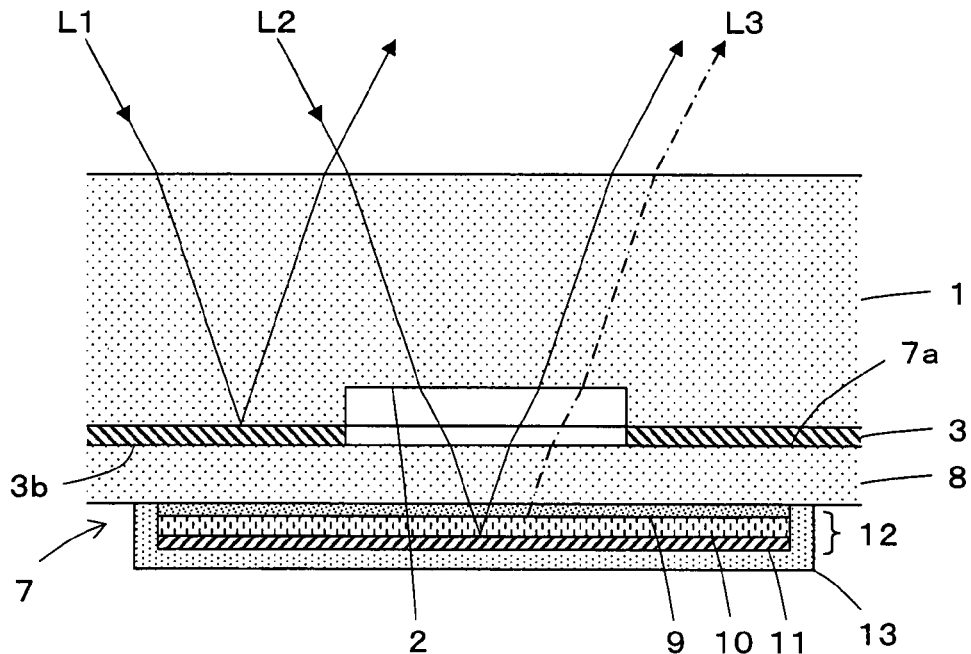
FIGS. 7 to 11 are sectional views each illustrating a structure of a display device according to each of Embodiments 5 to 9 of the present invention, respectively.

FIG. 7 is a sectional view of a display device according to Embodiment 5 of the present invention. In the display device, instead of the half mirror layer 4 and the light source 5 of the display device according to Embodiment 1 shown in FIG. 1, a mirror-type area emitting device 7 is provided as a light source on the rear surface 3b side of the light shielding layer 3. In Embodiment 5, the design information layer A is formed by the light shielding layer 3.

The area emitting device 7 includes an organic electroluminescence element 12 (hereinafter, referred to as "organic EL element 12"), which is obtained by laminating a transparent electrode layer 9, an organic layer 10 including a light emitting layer, and a reflecting electrode layer 11, on a transparent substrate 8. A protective layer 13 is formed so as to cover the whole of the organic EL element 12. The transparent substrate 8 has a back surface thereof as a front surface 7a of the area emitting device 7 facing the transparent plate 1 and the light shielding layer 3.

In the above-mentioned structure, the transparent substrate 8 may be formed of any material as long as the material has transparency with respect to visible light. Examples of the material include glass and resin. The transparent electrode layer 9 may be formed of any material as long as the material has a function as an electrode and transparency at least with respect to visible light. For example, ITO may be adopted as the material for forming the transparent electrode layer 9.

The organic layer 10 may employ a single-layer structure merely including a light emitting layer, or a multilayer structure in which a light emitting layer and at least one of a hole injection layer, a hole transporting layer, a hole injection and transporting layer, a hole blocking layer, an electron injection layer, an electron transporting layer, and an electron blocking layer are laminated. A material for forming the light emitting layer may include at least a known organic light emitting material such as $Alq_3$ or DCM. Also, the hole injection layer, the hole transporting layer, the hole injection and transporting layer, the hole blocking layer, the electron injection layer, the electron transporting layer, and the electron blocking layer each may be formed of a known material as appropriate.

The reflecting electrode layer 11 may be formed of any material as long as the material has a function as an electrode and reflectivity at least with respect to visible light. For example, Al, Cr, Mo, an alloy of Al, or a laminate of Al and Mo may be adopted for forming the reflecting electrode layer 11.

The protective layer 13 may be formed by, for example, plasma CVD of silicon nitride, silicon oxynitride, or silicon oxide.

Next, an operation of the display device according to Embodiment 5 is described. When the area emitting device 7 is not emitting light, the design formed by the recessed portion 2 can be identified through the transparent plate 1 by means of outside light. At this time, because the light shielding layer 3 having light reflectivity is provided on the rear surface 1b of the transparent plate 1 except for the region corresponding to the recessed portion 2, outside light L1 which has reached the light shielding layer 3 after passing through the transparent plate 1 is reflected by the front surface 3a of the light shielding layer 3 to pass through the transparent plate 1 again, and then exits outside.

Also, because the reflecting electrode layer 11 of the organic EL element 12 is provided so as to be facing the recessed portion 2 in the transparent plate 1, outside light L2 which has reached the recessed portion 2 after passing through the transparent plate 1 passes through the recessed portion 2, and further passes through the transparent substrate 8, the transparent electrode layer 9, and the organic layer 10 of the organic EL element 12. The outside light L2 is then reflected by the reflecting electrode layer 11 to again pass through the organic layer 10, the transparent electrode layer 9, the transparent substrate 8, the recessed portion 2, and the transparent plate 1, and exits outside.

As described above, outside light is similarly reflected on the rear surface 1b side of the transparent plate 1, regardless of whether the outside light has entered the region except for the recessed portion 2 or the region corresponding to the recessed portion 2. Accordingly, it appears as if a portion corresponding to the design formed by the recessed portion 2 and a portion except for the design are made of the same material. Further, due to the recessed portion 2, the portion corresponding to the design looks like being embossed with respect to the remaining portion, which gives an impression that as if the design is formed by stamping a metallic plate.

When the light shielding layer 3 and the reflecting electrode layer 11 of the organic EL element 12 have reflecting powers closer to each other, the portion corresponding to the design formed by the recessed portion 2 and the portion except for the design look more similar to each other. Accordingly, when the light shielding layer 3 and the reflecting electrode layer 11 of the organic EL element 12 have reflecting powers substantially equal to each other, the above-mentioned effect of making the design appear as if being formed by stamping a metallic plate becomes maximum.

Meanwhile, when a current is passed through between the transparent electrode layer 9 and the reflecting electrode layer 11 of the organic EL element 12 to turn the organic EL element 12 on, light L3 emitted by the organic layer 10 directly enters the transparent electrode layer 9, or enters the transparent electrode layer 9 after reflected by the reflecting electrode layer 11, and is further exited from the front surface 7a of the area light emitting device 7 after passing through the transparent substrate 8. The light L3 enters the transparent plate 1 after passing through the recessed portion 2 in which the light shielding layer 3 does not exist, and is exited outside after passing through the transparent plate 1. At this time, in the region except for the recessed portion 2, light emitted from the area emitting device 7 is shielded by the light shielding layer 3, and therefore only the portion corresponding to the design formed by the recessed portion 2 looks illuminated.

In other words, when the area emitting device 7 is not emitting light, it looks as if the design is formed by stamping a metallic plate, which gives an impression that light does not transmit through the design. However, when the area emitting device 7 starts emitting light, only the portion corresponding to the design is illuminated, to thereby attain a display device enhanced in appearance.

In Embodiment 5, because the area emitting device 7 using the organic EL element 12 is employed as a light source, it is possible to reduce the thickness of the display device with ease while forming the display device into a curved surface shape, which makes it easy to install the display device in an interior of a vehicle or the like.

Embodiment 6

Figure 8:
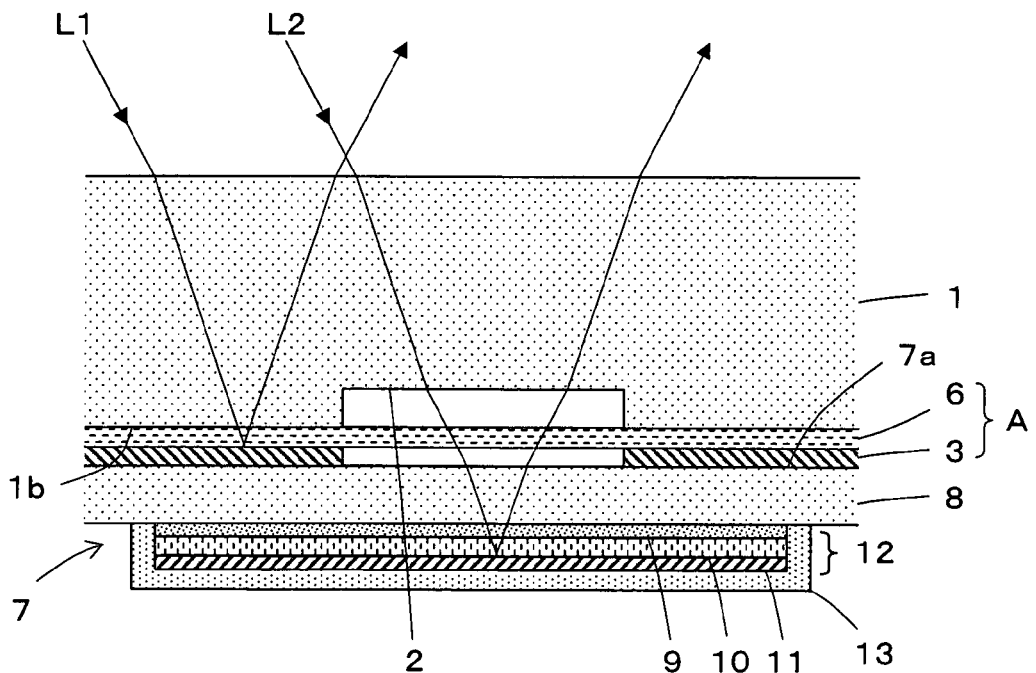

As shown in FIG. 8, an optically-transparent pattern layer 6 having a hairline pattern or the like provided over an entire surface thereof may additionally be provided to the display device of Embodiment 5 described above. The pattern layer 6 may be provided between the transparent plate 1 and the light shielding layer 3 so as to cover across an entire surface on the rear surface 1b side of the transparent plate 1, that is, across both of the region corresponding to the recessed portion 2 and the region except for the recessed portion 2. In Embodiment 6, the light shielding layer 3 and the pattern layer 6 form the design formation layer A.

With the above-mentioned structure, when the area emitting device 7 is not emitting light, the outside light L1 and the outside light L2, which pass through the transparent plate 1 to reach the light shielding layer 3 and the recessed portion 2, respectively, both pass through the pattern layer 6 to be reflected by the front surface 3a of the light shielding layer 3 and by the reflecting electrode layer 11 of the organic EL element 12, respectively, and exit outside after passing through the pattern layer 6 and the transparent plate 1 again. Accordingly, as in Embodiments 2 and 4, the pattern on the pattern layer 6 looks superimposed on the design formed by the recessed portion 2 and on the portion except for the design, which further enhances the effect of making those portions appear as if being formed of the same material.

Also, the pattern layer 6 and the light shielding layer 3 which form the design formation layer A may be sequentially laminated onto, for example, a transparent sheet material, so as to be integrally formed into a film sheet-like shape or a thin plate-like shape, and this lamination may be inserted between the transparent plate 1 and the area emitting device 7 in a manner that the pattern layer 6 faces the transparent plate 1.

Embodiment 7

Figure 9:
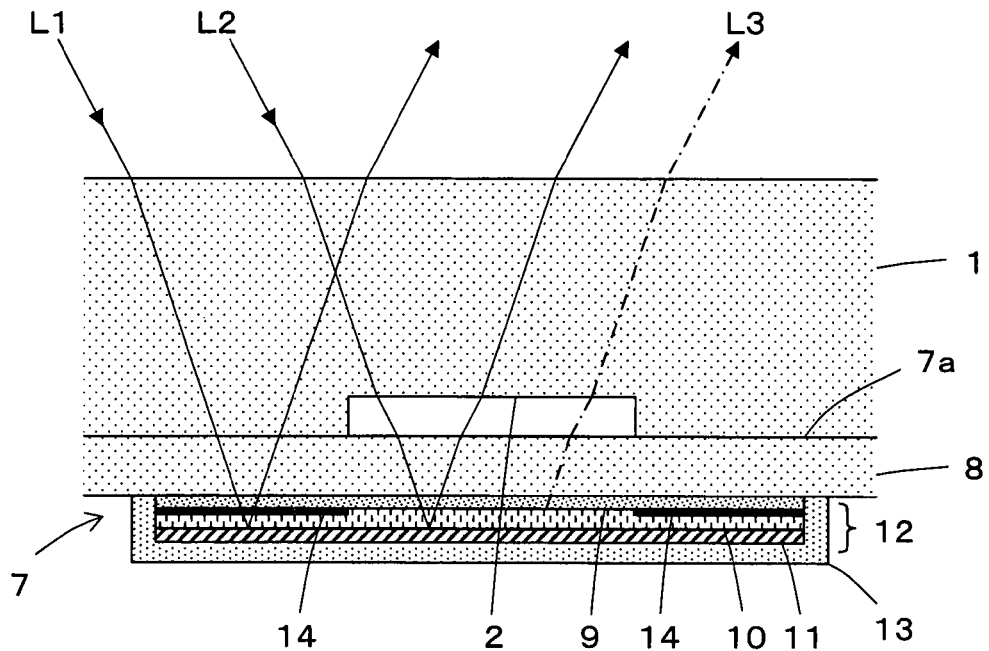

FIG. 9 is a sectional view of a display device according to Embodiment 7 of the present invention. In the display device, the light shielding layer 3 disposed on the rear side 1b of the transparent plate 1 of the display device according to Embodiment 5 shown in FIG. 7 is omitted, and the mirror-type area emitting device 7 exits light from the front surface 7a thereof only to the region corresponding to the recessed portion 2 in the transparent plate 1.

The area emitting device 7 includes an optically-transparent insulating layer 14 formed of an electrical insulator, which is pattern-formed between the transparent electrode layer 9 and the organic layer 10 of the organic EL element 12. The insulating layer 14 is patterned such that the insulating layer 14 does not exist in the region corresponding to the recessed portion 2 in the transparent plate 1 and exists only on the region except for the recessed portion 2.

Due to the insulating layer 14 thus provided, when a current is passed through between the transparent electrode layer 9 and the reflecting electrode layer 11 of the organic EL element 12 to turn the organic EL element 12 on, the organic EL element 12 emits light from the organic layer 10 only to the region corresponding to the recessed portion 2 in the transparent plate 1.

When the area emitting device 7 is not emitting light, the design formed by the recessed portion 2 can be identified through the transparent plate 1 by means of outside light. Since the insulating layer 14 has optical transparency, the outside light L1, which passes through the transparent plate 1 in the region except for the recessed portion 2 to reach the area emitting device 7, and the outside light L2, which passes through the transparent plate 1 in the region corresponding to the recessed portion 2 to reach the area emitting device 7, are both reflected by the reflecting electrode layer 11 of the organic EL element 12 to pass through the transparent plate 1 again, and then exit outside. In this manner, the outside light L1 and the outside light L2 are both reflected by the common reflecting electrode layer 11 in the region except for the recessed portion 2 and the region corresponding to the recessed portion 2. That is, the outside light L1 and the outside light L2 are reflected at the same reflecting power, which makes a portion corresponding to the design formed by the recessed portion 2 and a portion except for the design appear as if being made of the same material and the portion corresponding to the design looks embossed with respect to the remaining portion due to the recessed portion 2, giving an impression that as if the design is formed by stamping a metallic plate.

Meanwhile, when a current is passed through between the transparent electrode layer 9 and the reflecting electrode layer 11 of the organic EL element 12 to turn the organic EL element 12 on, the organic EL element 12 emits light L3 from the organic layer 10 only to the region corresponding to the recessed portion 2 in the transparent plate 1. The light L3 directly enters the transparent electrode layer 9, or enters the transparent electrode layer 9 after being reflected by the reflecting electrode layer 11, and is further exited from the front surface 7a of the area light emitting device 7 after passing through the transparent substrate 8. Then, the light L3 enters the transparent plate 1 after passing through the recessed portion 2, and is exited outside after passing through the transparent plate 1. At this time, in the region except for the recessed portion 2, light is not emitted by the organic layer 10 due to the insulating layer 14, and therefore only the portion corresponding to the design formed by the recessed portion 2 looks illuminated.

In other words, when the area emitting device 7 is not emitting light, it looks as if the design is formed by stamping a metallic plate, which gives an impression that light does not transmit through the design. However, when the area emitting device 7 starts emitting light, only the portion corresponding to the design is illuminated, to thereby attain a display device enhanced in appearance.

Embodiment 8

Figure 10:
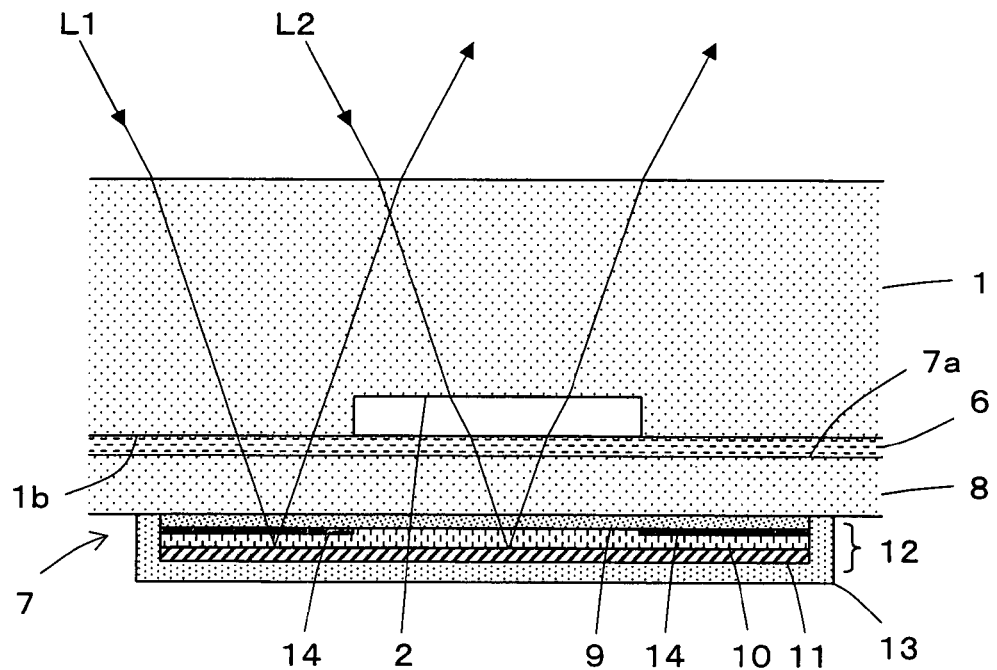

As shown in FIG. 10, an optically-transparent pattern layer 6 having a hairline pattern or the like provided over an entire surface thereof may additionally be provided to the display device of Embodiment 7 described above. The pattern layer 6 may be provided between the transparent plate 1 and the area emitting device 7 so as to cover across an entire surface on the rear surface 1b side of the transparent plate 1, that is, across both of the region corresponding to the recessed portion 2 and the region except for the recessed portion 2.

With the above-mentioned structure, when the area emitting device 7 is not emitting light, the outside light L1, which passes through the transparent plate 1 in the region except for the recessed portion 2 to reach the area emitting device 7, and the outside light L2, which passes through the transparent plate 1 in the region corresponding to the recessed portion 2 to reach the area emitting device 7, both pass through the pattern layer 6 to be reflected by the reflecting electrode layer 11 of the organic EL element 12, and pass through the pattern layer 6 and the transparent plate 1 again to exit outside. Accordingly, as in Embodiments 2, 4 and 6, the pattern on the pattern layer 6 looks superimposed on the design formed by the recessed portion 2 and on the portion except for the design, which further enhances the effect of making those portions appear as if being formed of the same material.

Embodiment 9

Figure 11:
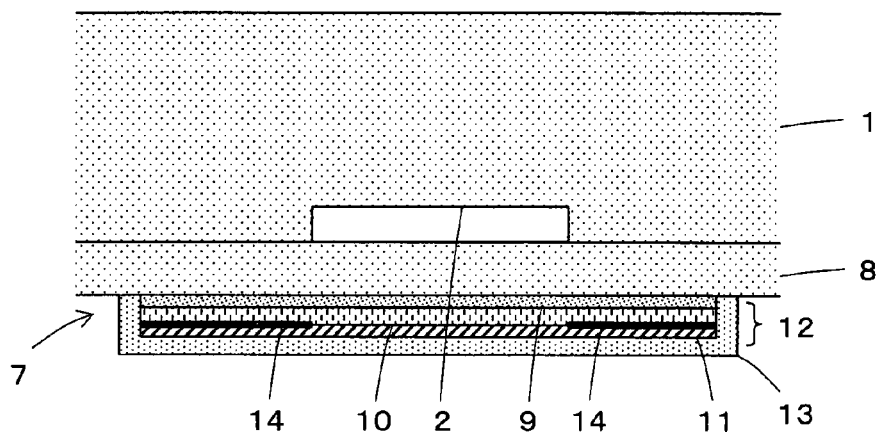

The area emitting device 7 employed in each of Embodiments 7 and 8 described above includes the insulating layer 14 which is pattern-formed between the transparent electrode layer 9 and the organic layer 10 of the organic EL element 12. Alternatively, as shown in FIG. 11, the optically-transparent insulating layer 14 formed of an electrical insulator may be pattern-formed between the organic layer 10 and the reflecting electrode layer 11 of the organic EL element 12. Even in this structure, light is emitted from the organic layer 10 only to the region corresponding to the recessed portion 2 in the transparent plate 1, to thereby produce an effect similar to those of Embodiments 7 and 8.

Figure 12:
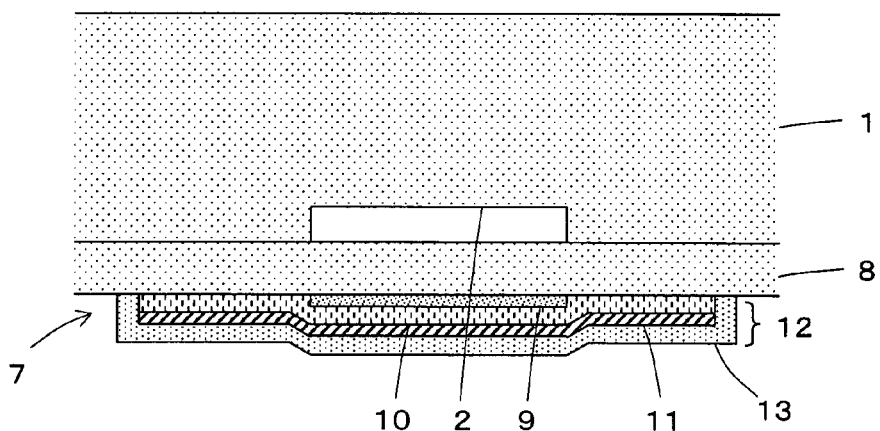
FIG. 12 is a sectional view illustrating a structure of a display device according to a modification example of Embodiment 9.

Also, as shown in FIG. 12, the transparent electrode layer 9 of the organic EL element 12 may be partially removed at a position corresponding to the region except for the recessed portion 2 in the transparent plate 1. Even in this structure, light is emitted from the organic layer 10 only to the region corresponding to the recessed portion 2 in the transparent plate 1, to thereby produce an effect similar to those of Embodiments 7 and 8.

Figure 13:
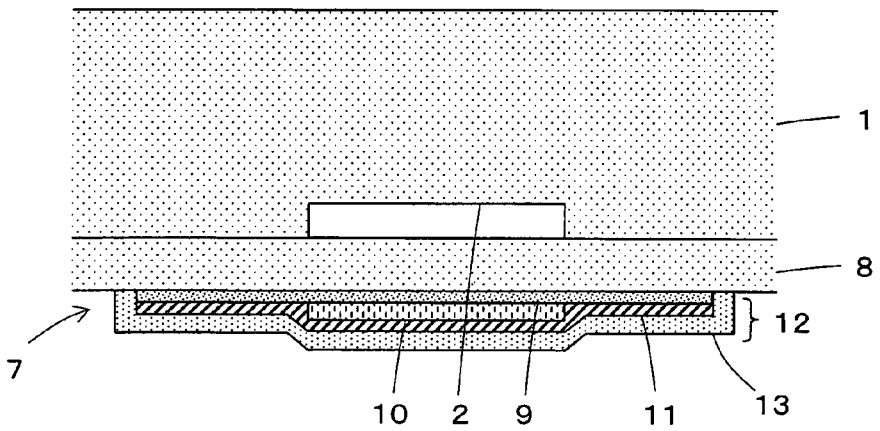
FIG. 13 is a sectional view illustrating a structure of a display device according to another modification example of Embodiment 9.

Further, as shown in FIG. 13, the organic layer 10 of the organic EL element 12 may be partially removed at a position corresponding to the region except for the recessed portion 2 in the transparent plate 1. The transparent electrode layer 9 and the reflecting electrode layer 11 of the organic EL element 12 at a position corresponding to the region except for the recessed portion 2 in the transparent plate 1 are electrically insulated from each other by an unillustrated insulating layer disposed therebetween. Even in this structure, light is emitted only to the region corresponding to the recessed portion 2 in the transparent plate 1, to thereby produce an effect similar to those of Embodiments 7 and 8.

Embodiment 10

Figure 14:
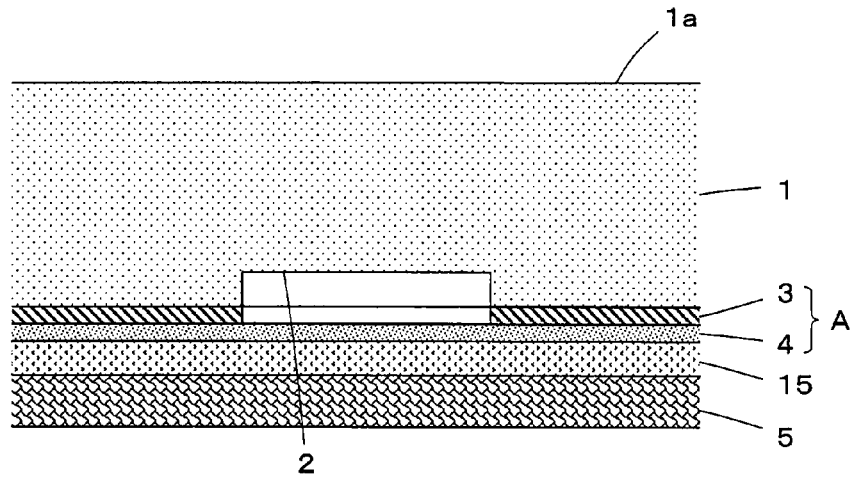
FIG. 14 is a sectional view illustrating a structure of a display device according to Embodiment 10.

FIG. 14 is a sectional view of a display device according to Embodiment 10 of the present invention. The display device is obtained by additionally providing a volume diffusion plate 15 to the display device according to Embodiment 1 shown in FIG. 1. The volume diffusion plate 15 is disposed between the design formation layer A which is formed of the light shielding layer 3 and the half mirror layer 4, and the light source 5.

The volume diffusion plate 15 diffuses light emitted from the light source 5 while absorbing luminance of the light, and is formed of a translucent resin including multiple fillers such as beads, or of a translucent resin having asperities on a surface thereof.

The volume diffusion plate 15 is provided between the design formation layer A and the light source 5, to thereby make it possible to uniformly illuminate the design formed by the recessed portion 2 in the transparent plate 1 even when the light source 5 having low luminance uniformity is used. Further, the volume diffusion plate 15 absorbs luminance, to thereby attain a display device which is illuminated at low intensity.

Further, as being increased in mechanical strength due to the volume diffusion plate 15, the transparent plate 1 can be reduced in thickness. When the thickness of the transparent plate 1 is reduced, the distance between the surface 1a and the recessed portion 2 in the transparent plate 1 is also reduced to reduce a sense of depth, giving a more prominent impression that as if the design is formed by stamping a metallic plate.

Also, when a transmission spectrum of the volume diffusion plate 15 is appropriately selected, it is possible to obtain an arbitrary emission color even when the same light source 5 is used.

Figure 15:
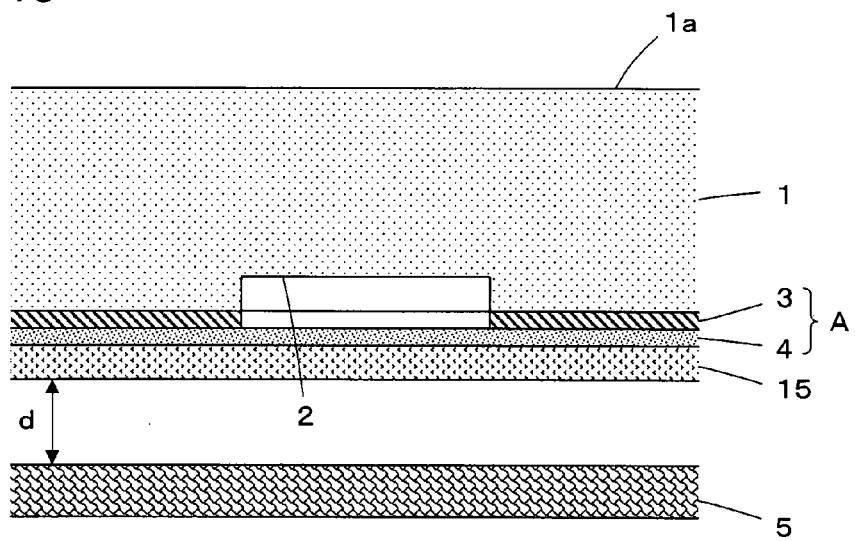
FIG. 15 is a sectional view illustrating a structure of a display device according to a modification example of Embodiment 10.

As shown in FIG. 15, when the volume diffusion plate 15 is disposed spaced apart from the front surface of the light source 5 to create a clearance d between the light source 5 and the volume diffusion plate 15, variations in the luminance of the light source 5 are made less noticeable, thereby making it possible to display the design uniformly. Also, even when the display device is used as, for example, a scuff plate of a vehicle such as an automobile, which may be applied with a load, the light source 5 is protected from the load which has been applied to the front surface 1a of the transparent plate 1 due to the clearance d between the light source 5 and the volume diffusion plate 15. The clearance d needs to be large enough that the volume diffusion plate 15 is not brought into contact with the front surface of the light source 5 even if the transparent plate 1 and the volume diffusion plate 15 are deformed due to the load applied to the transparent plate 1.

Figure 16:
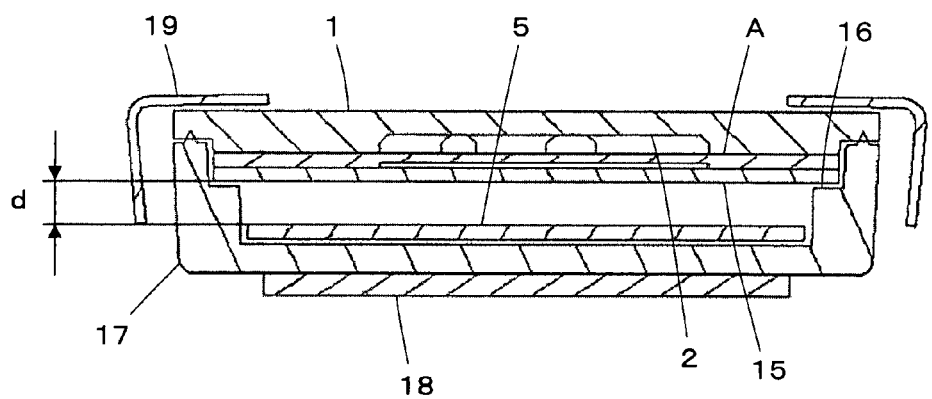
FIG. 16 is a sectional view illustrating an entire structure of the display device according to the modification example of Embodiment 10.

Specifically, as shown in FIG. 16, the light source 5 is fixed to a bottom of a case 17 which is open-topped and has steps 16 formed in side walls thereof, and the volume diffusion plate 15, the design formation layer A and the transparent plate 1 are sequentially stacked on the steps 16, to thereby create the clearance d between the light source 5 and the volume diffusion plate 15. The transparent plate 1 is ultrasonic-welded to the upper end of the case 17, whereby the volume diffusion plate 15 and the design formation layer A are sandwiched between the steps 16 of the case 17 and the transparent plate 1, with the result that a sealed casing structure is obtained. With this structure, the case 17 and the transparent plate 1 are integrated into a module, which increases the mechanical strength of the display device as a whole and prevents the entrance of a foreign object such as moisture or dust into a space between the light source 5 and the volume diffusion plate 15.

Note that the display device structured as described above may be fixed to an installation surface of a vehicle or the like by using an adhesive tape 18 attached to the backside of the case 17, and the design is displayed, for example, through an opening formed in a metallic plate 19 made of stainless or the like.

The above-mentioned structure can similarly be applied to the display device according to any of Embodiments 2 to 4 by providing the volume diffusion plate 15 between the design formation layer A and the light source 5, and disposing the volume diffusion plate 15 spaced apart from the front surface of the light source 5.

Embodiment 11

Figure 17:
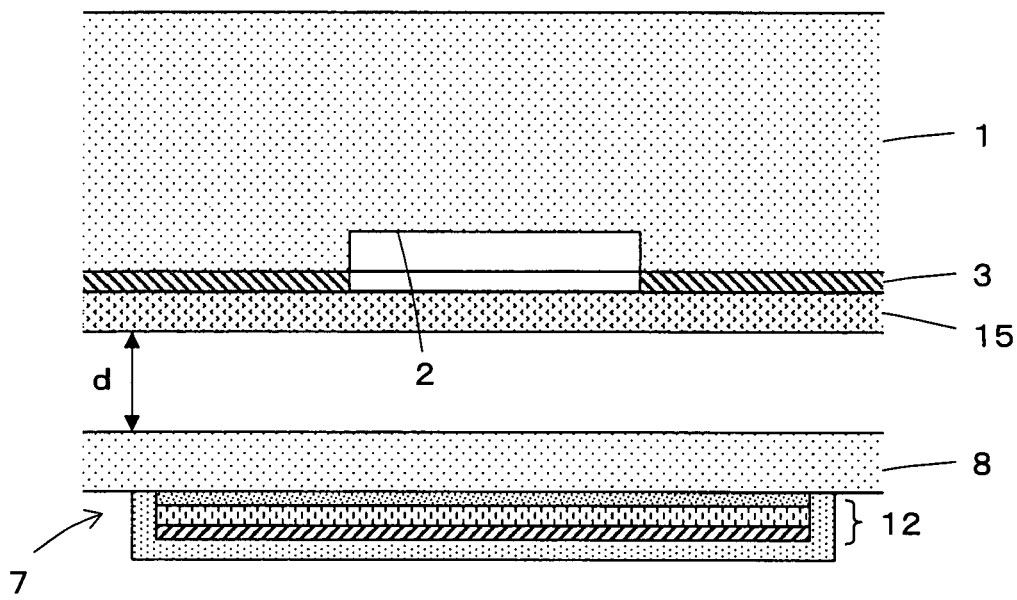
FIGS. 17 to 19 are sectional views each illustrating a structure of a display device according to each of Embodiments 11 to 13 of the present invention, respectively.

FIG. 17 is a sectional view of a display device according to Embodiment 11 of the present invention. The display device is obtained by applying the volume diffusion plate 15 to the display device according to Embodiment 5. The volume diffusion plate 15 is disposed on a rear surface side of the light shielding layer 3 forming the design formation layer A, and the area emitting device 7 is disposed spaced apart from the volume diffusion plate 15 by the clearance d.

In the case where an organic EL element having a luminescence peak of 2 wavelengths or more is used as the organic EL element 12 of the area emitting device 7, the organic EL element 12 is formed of materials different in electric characteristics for producing the wavelengths, which may lead to a variation in chromaticity when the organic EL element 12 is driven at a lower voltage. In view of this, it is necessary to apply a certain amount of voltage that is high enough to obtain a stable emitting state, and it has been difficult to attain a stable emission at low intensity. To the contrary, according to Embodiment 11, the volume diffusion plate 15 absorbs luminance, which makes it possible to attain the display device which can be illuminated at low intensity even when the organic EL element 12 is applied with a voltage high enough to stabilize the chromaticity.

Also, there may be generated a dark spot in the organic EL element due to a foreign object, but the dark spot can be made less noticeable due to the volume diffusion plate 15, which makes it possible to improve production yields of the display device.

Further, the area emitting device 7 uses the transparent substrate 8 made of glass or the like, which can be prevented from being damaged by the load applied to the transparent plate 1 because the volume diffusion plate 15 is provided and the clearance d is formed between the volume diffusion plate 15 and the surface emitting layer 7.

The above-mentioned structure can similarly be applied to the display device according to Embodiment 6 by providing the volume diffusion plate 15 between the design formation layer A and the light source 5, and disposing the volume diffusion plate 15 spaced apart from the front surface of the light source 5.

Embodiment 12

Figure 18:
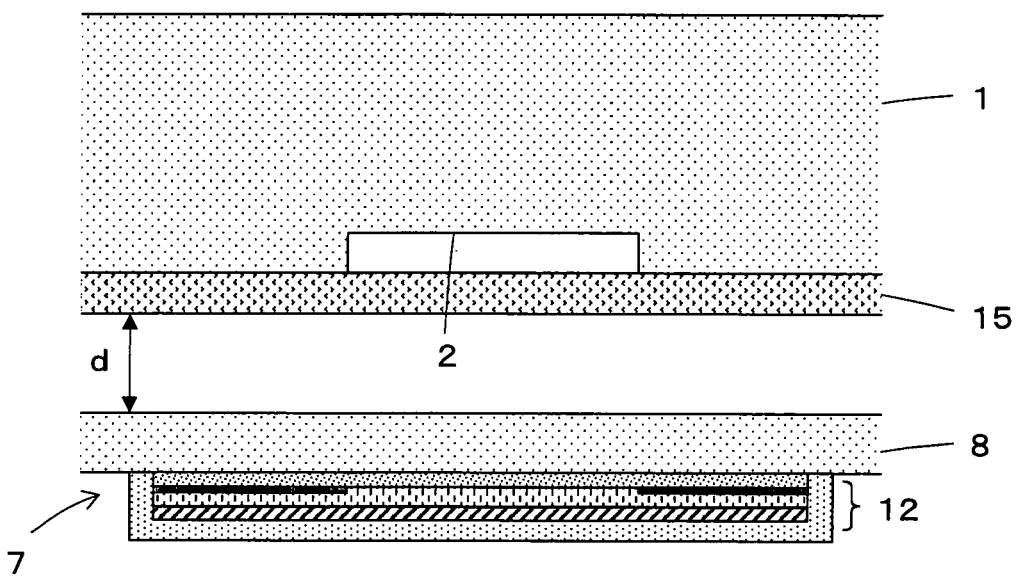

FIG. 18 is a sectional view of a display device according to Embodiment 12 of the present invention. The display device is obtained by applying the volume diffusion plate 15 to the display device according to Embodiment 7. The volume diffusion plate 15 is disposed between the transparent plate 1 and the area emitting device 7, and the clearance d is formed between the volume diffusion plate 15 and the area emitting device 7.

In this case as well, due to the volume diffusion plate 15, it is possible to attain the display device which is capable of being illuminated at low intensity, making the dark spot less noticeable to improve production yields of the device, and preventing the transparent substrate 8 of the area emitting device 7 from being damaged by the load applied to the transparent plate 1.

The above-mentioned structure can similarly be applied to the display device according to Embodiment 8 or 9 by providing the volume diffusion plate 15 between the transparent plate 1 and the light source 5, and disposing the volume diffusion plate 15 spaced apart from the front surface of the light source 5.

Embodiment 13

Figure 19:
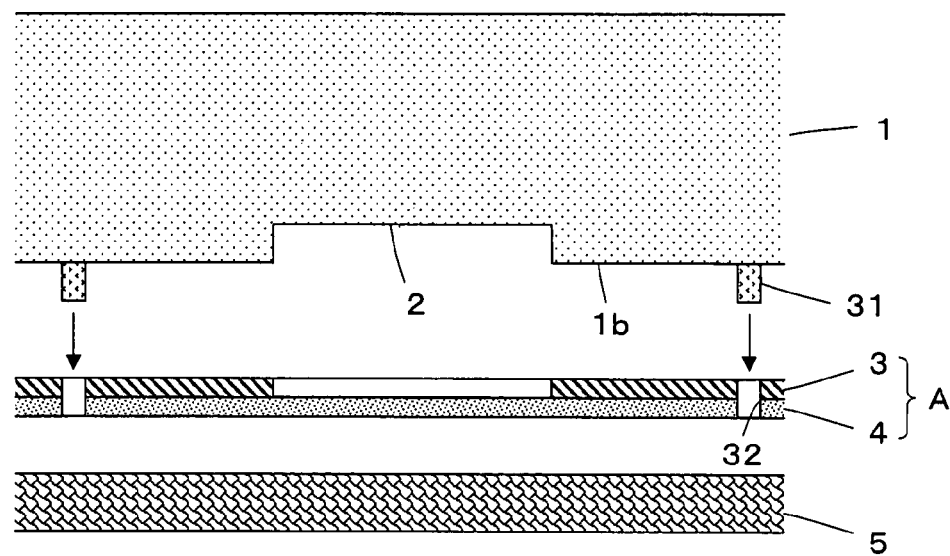

FIG. 19 is a sectional view of a display device according to Embodiment 13 of the present invention. The display device is obtained by additionally providing, to the display device according to Embodiment 1, positioning pins 31 formed on the rear surface 1b of the transparent plate 1 so as to protrude therefrom and positioning holes 32 formed in the design formation layer A including the light shielding layer 3 and the half mirror layer 4. The positioning pins 31 on the transparent plate 1 are inserted into the positioning holes 32 in the design formation layer A, to thereby position the transparent plate 1 and the design formation layer A each other. The positioning pins 31 and the positioning holes 32 form a positioning means.

For example, in the case of mounting the transparent plate 1 and the design formation layer A to the case 17 as shown in FIG. 16, if the transparent plate 1 and the design formation layer A are attached to the case 17 independently of each other, a dimensional deviation occurring in mounting the transparent plate 1 to the case 17 and dimensional deviation occurring in mounting the design formation layer A to the case 17 add up to a large dimensional deviation between the transparent plate 1 and the design formation layer A. By using the positioning means according to Embodiment 13, it is possible to reduce the mounting deviation between the transparent plate 1 and the design formation layer A, to thereby make the design look better.

Figure 19A:
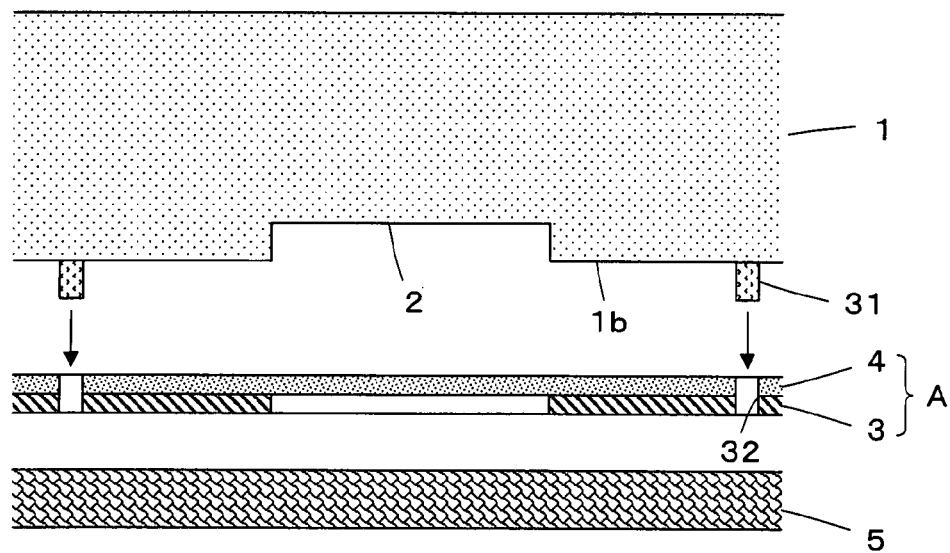
FIGS. 19A and 19B are sectional views each illustrating a structure of a display device according to each of modification examples of Embodiment 13.
Figure 19B:
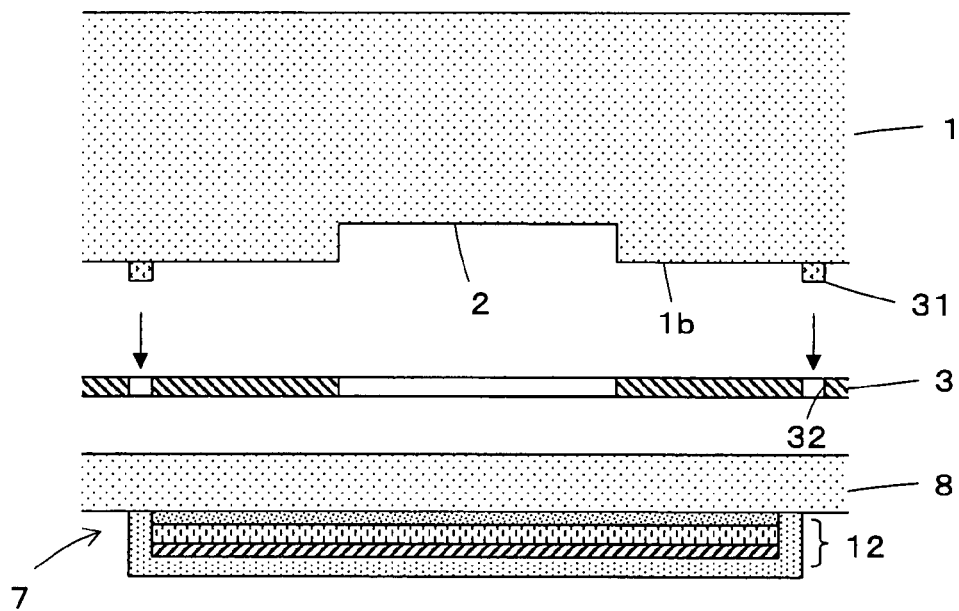

Similarly to the above, also in the display device according to any of Embodiments 2 to 6, 10 and 11, the positioning pins 31 may be formed on the rear surface 1b of the transparent plate 1 and the positioning holes 32 may be formed in the design formation layer A, as shown in FIGS. 19A and 19B, so as to reduce the mounting deviation between the transparent plate 1 and the design formation layer A.

Figure 20:
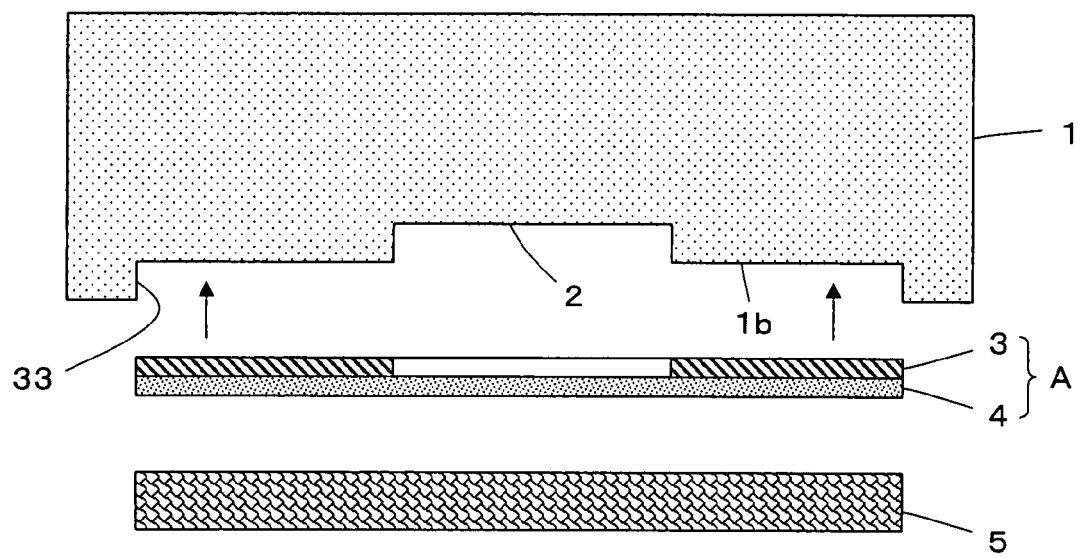
FIG. 20 is a sectional view illustrating a structure of the display device according to another modification example of Embodiment 13.

It should be noted that the positioning means is not limited to the combination of the positioning pins 31 and the positioning holes 32. For example, as shown in FIG. 20, stepped portions 33 may be formed on the outer edges of the rear surface 1b of the transparent plate 1, and the design formation layer A may be fit into a space defined by the stepped portions 33, to thereby reduce the mounting deviation between the transparent plate 1 and the design formation layer A.

Embodiment 14

Figure 21:
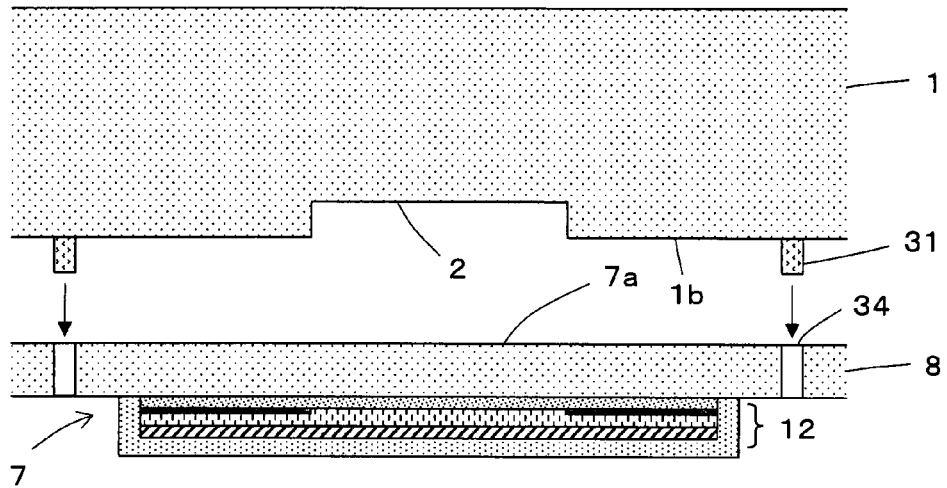
FIGS. 21 to 24 are sectional views each illustrating a structure of a display device according to each of Embodiments 14 to 17 of the present invention, respectively.

FIG. 21 is a sectional view of a display device according to Embodiment 14 of the present invention. The display device is obtained by additionally providing, to the display device according to Embodiment 7, the positioning pins 31 formed on the rear surface 1b of the transparent plate 1 so as to protrude therefrom and positioning holes 34 formed in the transparent substrate 8 of the area emitting device 7. The positioning pins 31 on the transparent plate 1 are inserted into the positioning holes 34 in the area emitting device 7, to thereby position the transparent plate 1 and the area emitting device 7 to each other. The positioning pins 31 and the positioning holes 34 form the positioning means.

Due to the positioning means formed as described above, the mounting deviation between the transparent plate 1 and the area emitting device 7 can be reduced, to thereby make the design look better.

Similarly to the above, also in the display device according to any of Embodiments 8, 9 and 12, the positioning pins 31 may be formed on the rear surface 1b of the transparent plate 1 and the positioning holes 34 may be formed in the area emitting device 7, to thereby reduce the mounting deviation between the transparent plate 1 and the area emitting device 7.

It should be noted that the positioning means is not limited to the combination of the positioning pins 31 and the positioning holes 34. For example, similarly to the display device shown in FIG. 20, the stepped portions 33 may be formed on the outer edges of the rear surface 1b of the transparent plate 1, and the area emitting device 7 may be fit into the space defined by the stepped portions 33, to thereby reduce the mounting deviation between the transparent plate 1 and the area emitting device 7.

Embodiment 15

Figure 22:
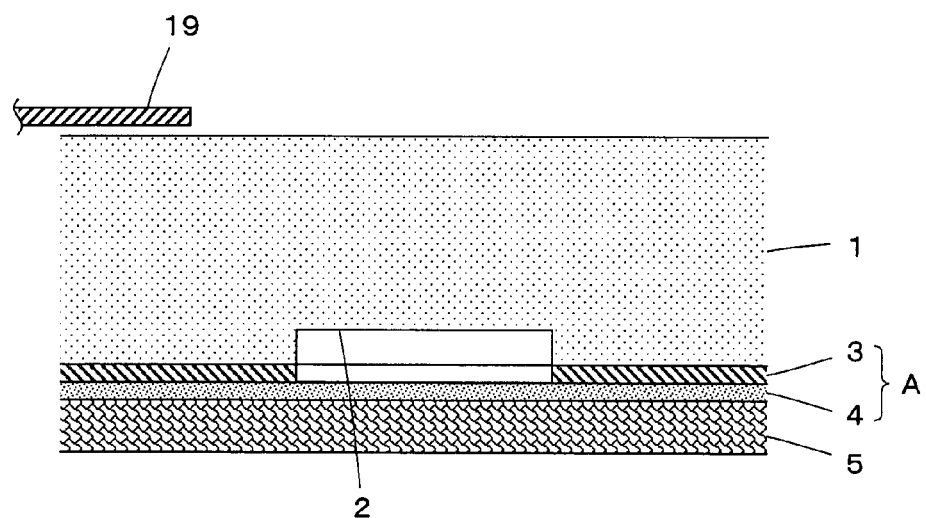

FIG. 22 is a sectional view of a display device according to Embodiment 15 of the present invention. The display device applies to a case where the display device according to Embodiment 1 is structured as shown in FIG. 16, in which the design is displayed through the opening formed in the metallic plate 19. According to the display device of Embodiment 15, a color of a material to be used for the light shielding layer 3 is selected such that the metallic plate 19 and the light shielding layer 3 appear with similar tone of color.

With the above-mentioned structure, the display device can be formed more integrally with the metallic plate 19 provided on the periphery thereof, to thereby attain the display device enhanced in appearance.

Similarly to the above, also a color of a material for the light shielding layer 3 in Embodiments 2 to 6, 10, 11 and 13, or a color of a material for the reflecting electrode layer 11 of the area emitting device 7 in Embodiments 7 to 9, 12 and 14 may be selected to impart a tone of color thereto similar to that of the metallic plate 19.

Embodiment 16

Figure 23:
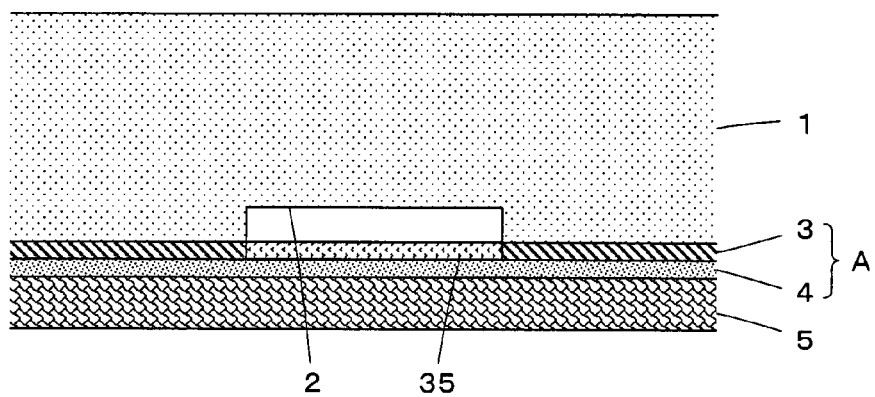

FIG. 23 is a sectional view of a display device according to Embodiment 16 of the present invention. The display device is obtained by modifying the display device according to Embodiment 1, such that the design formation layer A further includes a translucent layer 35 which is formed in the region corresponding to the recessed portion 2 of the transparent plate 1. The translucent layer 35 has a color different from that of the light shielding layer 3, whereby the difference between the recessed portion 2 and the region except for the recessed portion 2 in the transparent plate 1 is emphasized, imparting an enhanced spatial effect to the design to be identified.

Similarly to the above, it is possible to provide, in each of Embodiments 2 to 6, 10, 11 and 13, the translucent layer 35 to the region corresponding to the recessed portion 2 in the transparent plate 1.

Embodiment 17

Figure 24:
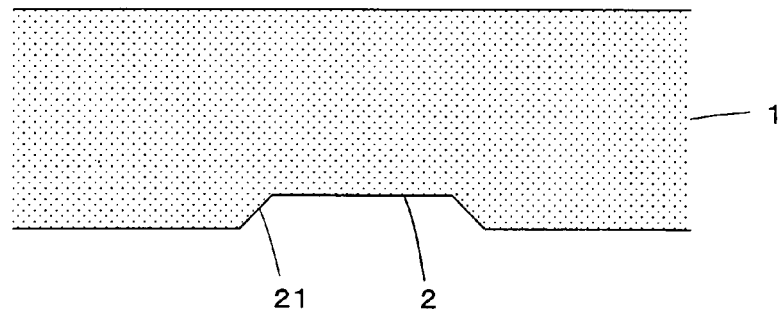

According to each of Embodiments 1 to 16 described above, the recessed portion 2 formed on the rear surface 1b side of the transparent plate 1 has a rectangular shape in cross-section. However, the recessed portion 2 may also be formed, for example, as shown in FIG. 24, in which the recessed portion 2 has corners 21 chamfered at 45 degrees through C-chamfering, which makes the contour of the design formed by the recessed portion 2 clearer, to thereby make it possible to produce a further enhanced effect of showing the design as if being made of a stamped metallic plate.

Figure 25:
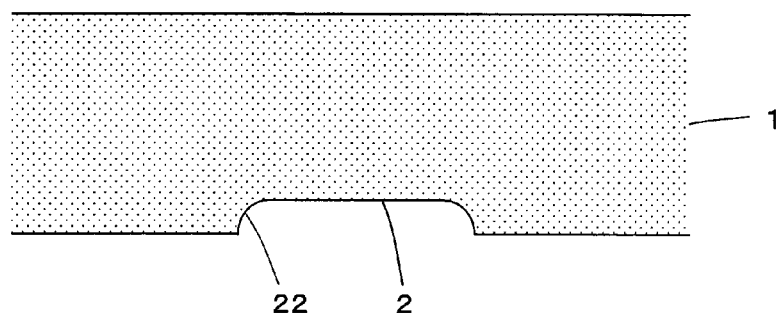
FIG. 25 is a sectional view illustrating a recessed portion of a transparent plate employed in a display device according to a modification example of Embodiment 17.
Figure 26:
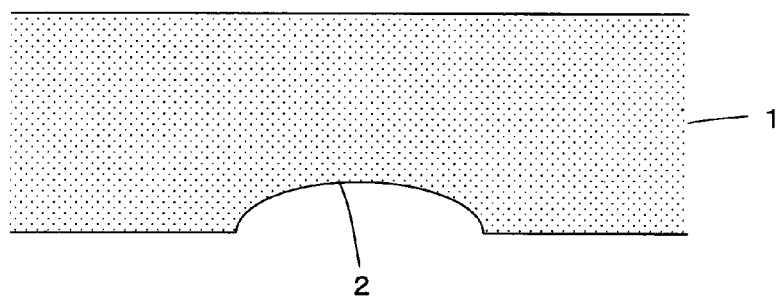
FIG. 26 is a sectional view illustrating a recessed portion of a transparent plate employed in a display device according to another modification example of Embodiment 17.

Also, the recessed portion 2 may be R-chamfered at least in part thereof. For example, as shown in FIG. 25, the recessed portion 2 may have corners 22 R-chamfered to provide a curved shape to the corners 22, or as shown in FIG. 26, the recessed portion 2 may entirely be formed into a curved shape, to thereby produce the same effect as described above.

Figure 27:
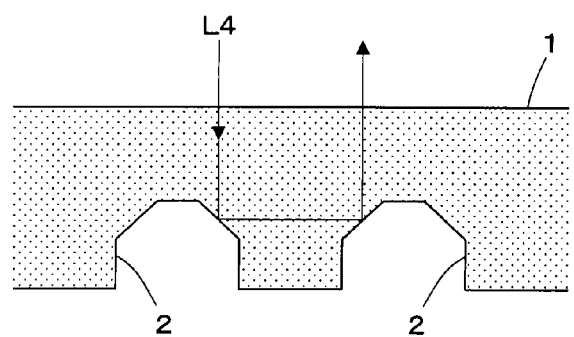
FIG. 27 is a diagram illustrating a problem occurring in a case where two recessed portions are provided in proximity to each other.

It should be noted that, as shown in FIG. 27, when a pair of the recessed portions 2 each having corners chamfered at 45 degrees through C-chamfering are provided close to each other, there is produced outside light L4 which enters the transparent plate 1 to be reflected at the C-chamfered portion of each of the recessed portions 2, and is exited outside of the transparent plate 1. Due to the outside light L4 described above, there may be a case where the C-chamfered portions are illuminated at an intensity higher than the remaining portion, making the design to be displayed strange.

Figure 28:
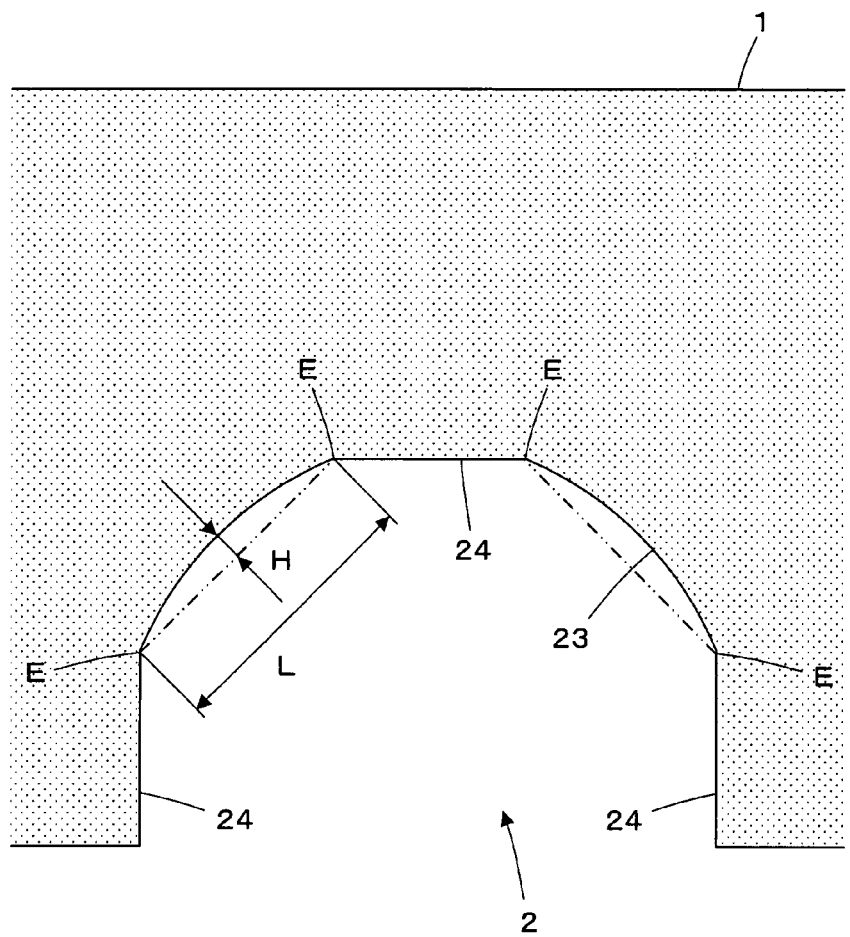
FIG. 28 is a sectional view illustrating a recessed portion of a transparent plate employed in a display device according to further another modification example of Embodiment 17.

In view of the above, as shown in FIG. 28, it is preferable that the recessed portion 2 have a flat portion 24 connected to a curved surface portion 23 such that the flat portion 24 and the curved surface portion 23 form an angular interface portion E. In this manner, as compared with a case where the recessed portion 2 is R-chamfered or a case where the recessed portion 2 is formed only of the flat portions as shown in FIG. 27, it is possible to prevent light from being reflected by the curved surface portion 23 in the same direction, while displaying the design more sharply, to thereby ensuring the spatial effect of the design.

In this case, it is preferable that a height H of the curved surface portion 23 with respect to a length L of the curved surface portion may substantially satisfy H/L=1/10 to 1/20.

The recessed portion 2 may be in any cross-sectional shape which is selected according to the design to be displayed. It is preferable to R-chamfer the recessed portion 2 in order to suppress reflection to make the design appear as flat. In order to display the design spatially, or display the contour of the design more clearly, the recessed portion 2 may preferably be C-chamfered. In order to display the design spatially while suppressing reflection, it is preferable to form the recessed portion 2 only with flat portions. In particular, when two or more designs are positioned closer to one another, it is preferable that the recessed portion 2 be formed of a flat portion and a curved surface portion, and the flat portion and the curved surface portion which are adjacent to each other be connected to each other so as to form an angular interface portion.

Embodiment 18

Figure 29:
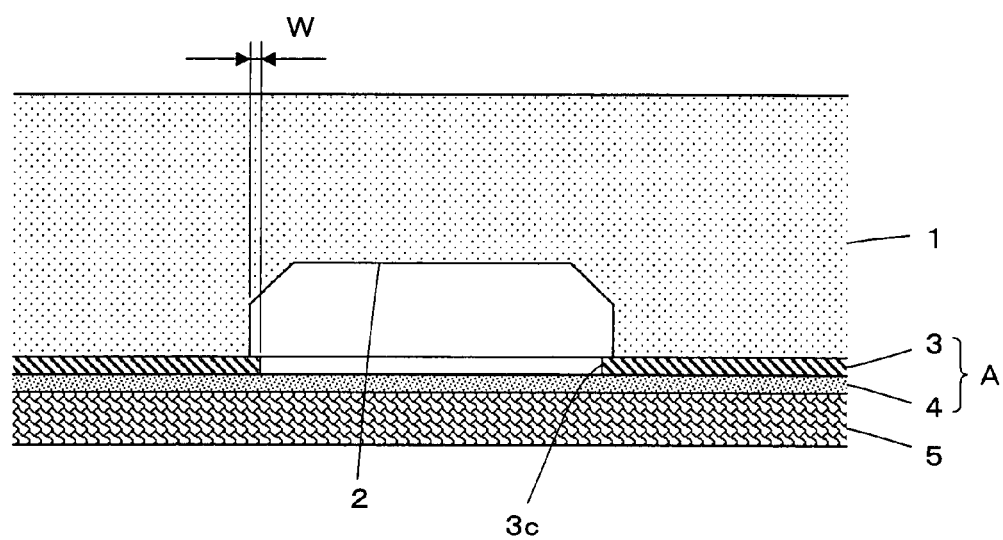
FIG. 29 is a sectional view illustrating a structure of a display device according to Embodiment 18 of the present invention.

FIG. 29 is a sectional view of a display device according to Embodiment 18 of the present invention. In the display device, the recessed portion 2 in the transparent plate 1 is formed to be larger than the size of the design to be illuminated by the light source 5, by a predetermined amount W. Specifically, because the size of the design to be illuminated is defined by an opening 3c of the light shielding layer 3, the recessed portion 2 in the transparent plate 1 is formed to be larger than the opening 3c of the light shielding layer 3, by the predetermined amount W.

With this structure, even when the mounting deviation exists between the design formation layer A and the transparent plate 1, it is possible to prevent a situation where the design to be illuminated by the light source 5 partially lies off the edge of the recessed portion 2 in the transparent plate 1, thereby preventing deterioration in appearance of the design.

Also, because the opening 3c of the light shielding layer 3 is formed to be smaller than the recessed portion 2 in the transparent plate 1, in the case where the recessed portion 2 in the transparent plate 1 is C-chamfered at the corners thereof as shown in FIG. 29, the amount of light to be irradiated onto the C-chamfered portion of the recessed portion 2 is reduced. As a result, the C-chamfered portion looks darker, whereby the spatial effect in displaying the design is emphasized.

Embodiment 18 described above can be applied to the display device according to any of Embodiments 1 to 17 described above.

It should be noted that in each of Embodiments 5 to 9, 12 and 14 of the present invention, the area emitting device 7 having an organic EL device of bottom-emission type is used. However, the present invention is not limited to this, and it is also possible to employ a mirror-type area emitting device having an organic EL device of top-emission type, as the area emitting device 7. It is also possible to employ a mirror-type area emitting device having an inorganic EL device instead of an organic EL device.

Figure 30:
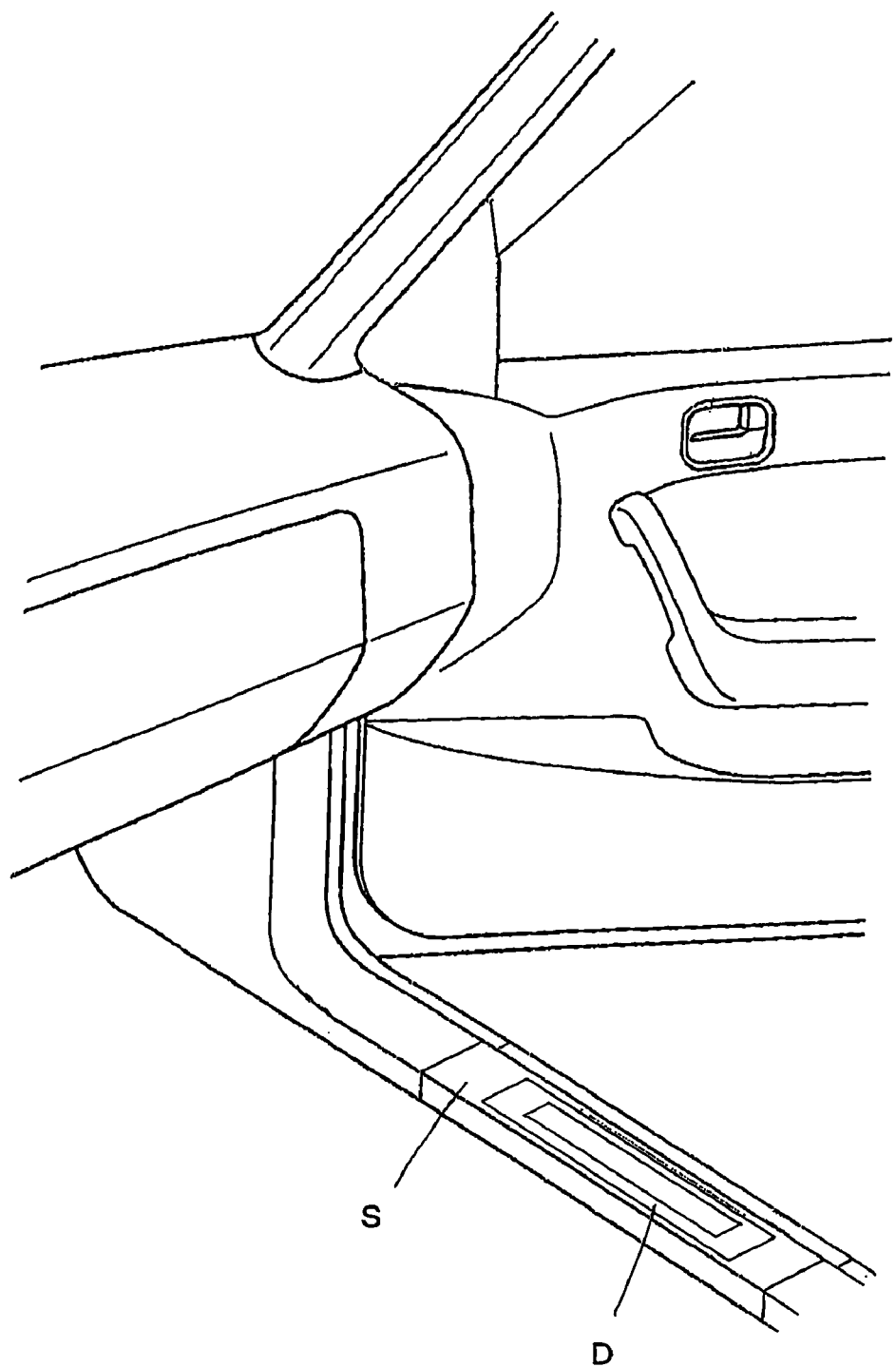
FIG. 30 is a partial perspective view illustrating an interior of a vehicle in which the display device according to the present invention is applied to a scuff plate of the vehicle.

The display device D according to the present invention may be installed in a scuff plate S as shown in FIG. 30, for example, in an interior of a vehicle or the like.

When the display device D according to any of Embodiments 1 to 18 of the present invention is installed in the scuff plate S, and characters indicating, for example, a type of the vehicle or a company name, are displayed, the characters appear as if being formed by stamping a metallic plate when not illuminated. The portions corresponding to the characters glow when the display device D is illuminated, to thereby enhance the appearance of the displayed characters. Also, the characters are illuminated at intensity (for example, intensity of 10 cd or less) lower than that of outside light even when illuminated, to thereby make the display device D appear as if the display device D is not illuminated, even when the light source is emitting light.

The display device D may display not only characters, but also a logotype, a mark, a geometric pattern, or the like. The display device D may also be employed as interior lighting of a vehicle.

When the display device D according to the present invention is installed in the scuff plate S, it is preferable that the display device D be driven in conjunction with the opening and closing of the door in such a manner that the display device D is illuminated when the door is opened.

The display device D according to the present invention may be installed not only in the scuff plate S but also in various places of an interior of a vehicle. In particular, as in each of Embodiments 5 to 9, 12 and 14 of the present invention, when the area emitting device 7 using the organic EL element 12 is employed as the light source, the display device can be reduced in thickness and formed into a curved surface shape with ease, which makes it possible to increase the variety of places where the display device can be installed.

Further, the display device according to the present invention can be installed not only in a vehicle such as an automobile, but also in an interior of a building, furniture, an electric appliance, or the like, and the installation place of the display device is not particularly limited.

What is claimed is:

1. A display device, comprising:
   a transparent plate having at least one recessed portion formed on a rear surface side thereof, the recessed portion forming a pattern corresponding to a design to be displayed;
   a first reflecting member which is disposed on the rear surface side of the transparent plate and on a region except for the recessed portion of the transparent plate, and has light reflectivity at a surface facing the transparent plate;
   a second reflecting member which is disposed on the rear surface side of the transparent plate and on a region including the recessed portion of the transparent plate, and has light reflectivity at a surface facing the transparent plate; and
   a light source for emitting light, when illuminated, to a front surface side of the transparent plate through the recessed portion of the transparent plate without exiting light from the region except for the recessed portion of the transparent plate to the front surface side of the transparent plate, the light source being disposed on the rear surface side of the transparent plate.

2. A display device according to claim 1, wherein:
   the first reflecting member comprises a light shielding layer having light reflectivity at a front surface facing the transparent plate;
   the second reflecting member comprises a half mirror layer; and
   the light source is disposed on a rear surface side of the first reflecting member and on a rear surface side of the second reflecting member.

3. A display device according to claim 1, wherein:
   the first reflecting member comprises a half mirror layer and a light shielding layer disposed on a rear surface side of the half mirror layer;
   the second reflecting member comprises a half mirror layer; and
   the light source is disposed on a rear surface side of the first reflecting member and on a rear surface side of the second reflecting member.

4. A display device according to claim 1, wherein:
   the first reflecting member comprises a light shielding layer having light reflectivity at a front surface facing the transparent plate;
   the light source comprises a mirror-type area emitting device which includes a reflecting layer on a rear surface side thereof and emits light from a front surface thereof, the mirror-type area emitting device being disposed on a rear surface side of the first reflecting member and at least on a region corresponding to the recessed portion of the transparent plate; and
   the second reflecting member comprises the reflecting layer of the mirror-type area emitting device.

5. A display device according to claim 1, wherein:
   the light source comprises a mirror-type area emitting device which has a reflecting layer on a rear surface side thereof and emits light from a front surface thereof only to the region corresponding to the recessed portion of the transparent plate; and
   the first reflecting member and the second reflecting member each comprise the reflecting layer of the mirror-type area emitting device.

6. A display device according to claim 1, wherein the first reflecting member and the second reflecting member have reflecting powers substantially equal to each other.

7. A display device according to claim 1, wherein the first reflecting member and the second reflecting member have reflectance spectra substantially equal to each other.

8. A display device according to claim 1, further comprising an optically-transparent pattern layer having a desired pattern provided thereon, the optically-transparent pattern layer being provided between the transparent plate and the first reflecting member and between the transparent plate and the second reflecting member, and across an entire surface on the rear surface side of the transparent plate.

9. A display device according to claim 4, wherein the mirror-type area emitting device comprises:
   an electroluminescence device including a reflecting electrode layer forming the reflecting layer;

a transparent electrode layer; and a light emitting layer interposed between the reflecting electrode layer and the transparent electrode layer.

10. A display device according to claim 5, wherein:
the mirror-type area emitting device comprises:
an electroluminescence device including a reflecting electrode layer forming the reflecting layer;
a transparent electrode layer; and
a light emitting layer interposed between the reflecting electrode layer and the transparent electrode layer, the transparent electrode layer being partially removed at a position corresponding to the region except for the recessed portion of the transparent plate.

11. A display device according to claim 5, wherein the mirror-type area emitting device comprises:
an electroluminescence device including a reflecting electrode layer forming the reflecting layer;
a transparent electrode layer;
a light emitting layer interposed between the reflecting electrode layer and the transparent electrode layer; and
an optically-transparent insulating layer provided between the light emitting layer and one of the reflecting electrode layer and the transparent electrode layer at a position corresponding to the region except for the recessed portion of the transparent plate.

12. A display device according to claim 2, further comprising a translucent layer having a color different from a color of the light shielding layer, the translucent layer being formed on the region corresponding to the recessed portion of the transparent plate.

13. A display device according to claim 1, further comprising a volume diffusion layer disposed between the transparent plate and the light source.

14. A display device according to claim 13, wherein the volume diffusion layer is disposed spaced apart from a front surface of the light source.

15. A display device according to claim 2, wherein the first reflecting member and the second reflecting member are formed into a thin plate member which is provided separately from the transparent plate.

16. A display device according to claim 15, further comprising a positioning means for positioning the transparent plate and the thin plate member to each other.

17. A display device according to claim 3, wherein the first reflecting member and the second reflecting member are formed into a thin plate member which is provided separately from the transparent plate.

18. A display device according to claim 17, further comprising a positioning means for positioning the transparent plate and the thin plate member to each other.

19. A display device according to claim 4, wherein the first reflecting member is formed into a thin plate member which is provided separately from the transparent plate.

20. A display device according to claim 19, further comprising a positioning means for positioning the transparent plate and the thin plate member to each other.

21. A display device according to claim 5, further comprising a positioning means for positioning the transparent plate and the mirror-type area emitting device to each other.

22. A display device according to claim 1, wherein the recessed portion of the transparent plate is C-chamfered.

23. A display device according to claim 1, wherein the recessed portion of the transparent plate is R-chamfered at least in part.

24. A display device according to claim 23, wherein the recessed portion of the transparent plate includes a plurality of flat portions and a plurality of curved surface portions, each of the plurality of flat portions and each of the plurality of curved surface portions being connected to each another.

25. A display device according to claim 24, wherein each of the plurality of flat portions and each of the plurality of curved surface portions which are adjacent to each other are connected to each other to form an angular interface portion.

26. A display device according to claim 1, wherein the recessed portion of the transparent plate is formed to be larger than a size of the design to be illuminated by the light source, by a predetermined amount.

* * * * *